United States Patent
Kim et al.

(10) Patent No.: US 10,261,686 B2
(45) Date of Patent: Apr. 16, 2019

(54) MOBILE TERMINAL AND CONTROL METHOD THEREOF

(71) Applicant: LG ELECTRONICS INC., Seoul (KR)

(72) Inventors: Intai Kim, Seoul (KR); Daewoo Lee, Seoul (KR); Jaeyong Park, Seoul (KR); Sumi Kim, Seoul (KR); Hyojeong Jang, Seoul (KR); Minseok Hwangbo, Seoul (KR); Hyunju Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 999 days.

(21) Appl. No.: 14/592,141

(22) Filed: Jan. 8, 2015

(65) Prior Publication Data
US 2015/0268854 A1 Sep. 24, 2015

(30) Foreign Application Priority Data

Mar. 20, 2014 (KR) .................. 10-2014-0032969

(51) Int. Cl.
*G06F 3/00* (2006.01)
*G06F 3/0488* (2013.01)
(Continued)

(52) U.S. Cl.
CPC ........ *G06F 3/04886* (2013.01); *G06F 3/0233* (2013.01); *G06F 3/0481* (2013.01);
(Continued)

(58) Field of Classification Search
CPC . G06F 3/0481; G06F 3/04812; G06F 3/04886
See application file for complete search history.

(56) References Cited

U.S. PATENT DOCUMENTS

| | | | |
|---|---|---|---|
| 5,625,782 A * | 4/1997 | Soutome | G06F 3/0485 345/660 |
| 6,587,132 B1 * | 7/2003 | Smethers | G06F 3/04892 345/160 |

(Continued)

FOREIGN PATENT DOCUMENTS

CN 102033704 4/2011

OTHER PUBLICATIONS

European Search Report dated Oct. 23, 2015 for European Application No. 15156265.9.

(Continued)

*Primary Examiner* — Kieu D Vu
*Assistant Examiner* — Andrew Chung
(74) *Attorney, Agent, or Firm* — KED & Associates LLP

(57) ABSTRACT

Disclosed are a mobile terminal and a control method thereof, which has a display unit for displaying a virtual keypad and texts input by the virtual keypad. The mobile terminal includes a display unit and a controller. The display unit has a first area in which a virtual keypad is displayed and a second area in which a character input by a touch applied to the virtual keypad is displayed, and displays a first cursor for guiding a position at which a character is to be input. When an editing mode is executed in the state in which the first cursor is displayed, the controller displays, in the second area, a second cursor different from the first cursor, and selectively activates any one of the first and second cursors.

13 Claims, 23 Drawing Sheets

(51) Int. Cl.
G06F 3/0481 (2013.01)
G06F 17/27 (2006.01)
G06F 3/023 (2006.01)
G06F 9/54 (2006.01)
G06F 3/0482 (2013.01)
G06F 3/0484 (2013.01)
G06F 17/24 (2006.01)

(52) U.S. Cl.
CPC ........ *G06F 3/0482* (2013.01); *G06F 3/04812* (2013.01); *G06F 3/04817* (2013.01); *G06F 3/04842* (2013.01); *G06F 9/543* (2013.01); *G06F 17/24* (2013.01); *G06F 17/273* (2013.01)

(56) References Cited

U.S. PATENT DOCUMENTS

| | | | | |
|---|---|---|---|---|
| 6,957,397 | B1* | 10/2005 | Hawkins | G06F 3/0482 715/810 |
| 8,739,055 | B2* | 5/2014 | Coddington | G06F 3/0236 715/257 |
| 8,959,433 | B2* | 2/2015 | Schubert | G06F 17/24 715/256 |
| 2006/0265239 | A1* | 11/2006 | Schluetter | G06F 3/04812 715/856 |
| 2008/0134033 | A1 | 6/2008 | Burns et al. | |
| 2008/0316212 | A1 | 12/2008 | Kushler | |
| 2009/0182552 | A1 | 7/2009 | Fyke et al. | |
| 2010/0287486 | A1* | 11/2010 | Coddington | G06F 3/0236 715/769 |
| 2011/0202869 | A1* | 8/2011 | Sung | G06F 3/04892 715/784 |
| 2012/0304048 | A1* | 11/2012 | Aoki | G06F 3/0481 715/234 |
| 2013/0036388 | A1* | 2/2013 | Kirkpatrick | G06F 3/04883 715/856 |
| 2013/0113717 | A1 | 5/2013 | Van Eerd et al. | |
| 2013/0127703 | A1* | 5/2013 | Wendt | G06F 17/211 345/156 |
| 2013/0132871 | A1* | 5/2013 | Zeng | G06F 3/018 715/762 |
| 2014/0047394 | A1* | 2/2014 | Kushler | G06F 3/04812 715/856 |
| 2014/0109016 | A1* | 4/2014 | Ouyang | G06F 17/24 715/856 |
| 2014/0359525 | A1* | 12/2014 | Weiner | G06F 3/04815 715/782 |
| 2015/0026627 | A1* | 1/2015 | Ikeda | G06F 1/1671 715/773 |

OTHER PUBLICATIONS

Hoffman; "42+ Texting-Editing Keyboard Shortcuts That Work Almost Everywhere-How to Geek"; Jun. 7, 2012; retrieved from the Internet: URL:https:/ /web.archive.org/web/20120607214018/http:/ /www.howtogeek.com/115664 /42-text-editing-keyboard-shortcutsr-that-work-almost-everywhere/ [retrieved on Oct. 9, 2015].
European Search Report issued in Application No. 15156265.9 dated Jul. 21, 2015.
Chinese Office Action dated Sep. 25, 2017, issued in Application No. 201510124705.9 (with English translation).

* cited by examiner

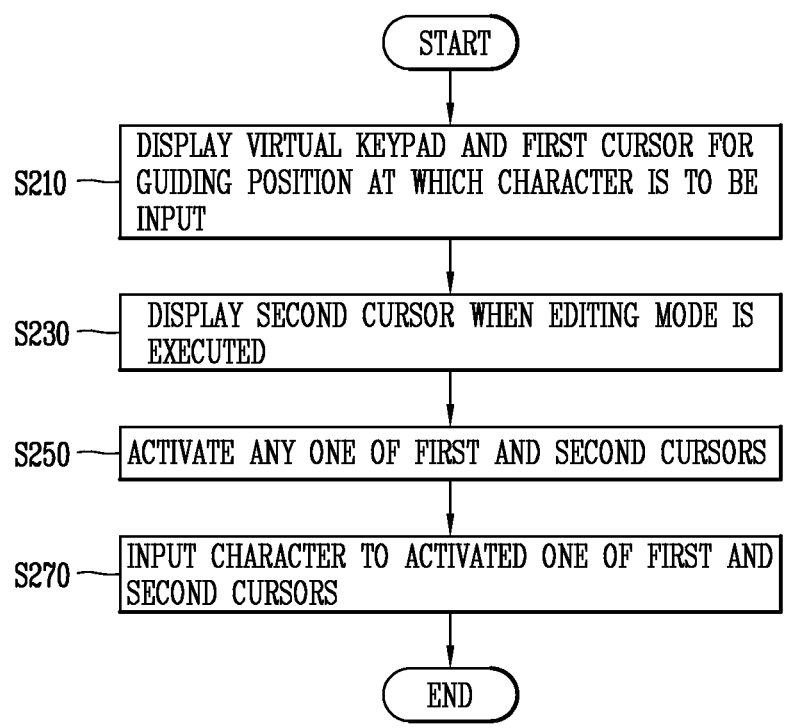

(a)　　　(b)

(a)　　　(b)

MOBILE TERMINAL AND CONTROL METHOD THEREOF

CROSS-REFERENCE TO RELATED APPLICATION

Pursuant to 35 U.S.C. § 119(a), this application claims the benefit of earlier filing date and right of priority to Korean Application No. 10-2014-0032969, filed on Mar. 20, 2014, the contents of which is incorporated by reference herein in its entirety.

BACKGROUND OF THE INVENTION

1. Field of the Invention

The present disclosure relates to a mobile terminal and a control method thereof, which has a display unit for displaying a virtual keypad and texts input by the virtual keypad.

2. Description of the Conventional Art

A terminal is broadly categorized by mobility into a mobile terminal and a stationary terminal. The mobile terminal is further categorized by portability into a handheld terminal and a vehicle-mounted terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Owing to this improvement, a user applies a touch to a virtual keypad displayed on a display unit, thereby inputting texts in a mobile terminal. The input texts are displayed on the display unit. Since a cursor for guiding a position at which a text is to be input is displayed, the user can input a text at a desired position using the cursor. Meanwhile, if a typographical error (typo) is included in the input text, the user should delete or correct the typo by moving the cursor to a corresponding position. In this case, there is a problem in that it is difficult to exactly move the cursor to the position corresponding to the typo. In addition, there is an inconvenience in that the user should again move the cursor to the original position after the typo is corrected.

SUMMARY OF THE INVENTION

Therefore, an aspect of the detailed description is to provide a new user interface capable of correcting a typographical error (typo) through simple manipulation when the typo is included in an input text.

Another aspect of the detailed description to provide a user interface capable of correcting a typo included in the middle of an input text and then returning the position of a cursor to the position at which the cursor has been displayed before the typo is corrected.

To achieve these and other advantages and in accordance with the purpose of this specification, as embodied and broadly described herein, a mobile terminal includes: a display unit configured to have a first area in which a virtual keypad is displayed and a second area in which a character input by a touch applied to the virtual keypad is displayed, and display a first cursor for guiding a position at which a character is to be input; and a controller configured to display, in the second area, a second cursor different from the first cursor, and selectively activate any one of the first and second cursors, when an editing mode is executed in the state in which the first cursor is displayed.

In one exemplary embodiment, the character input by the virtual keypad may be input at the position of the activated one of the first and second cursors.

In one exemplary embodiment, when a typographical error (typo) is included in a text input by a user, the controller may display the second cursor formed to correct the typo at a position corresponding to the typo.

In one exemplary embodiment, when any one of the first and second cursors is activated, the activated one may be highlighted to be distinguished from the other.

In one exemplary embodiment, when the editing mode is executed, a cursor selection icon formed to selectively activate any one of the first and second cursors may be displayed on the display unit, and any one of the first and second cursors may be activated by a touch applied to the cursor selection icon.

In one exemplary embodiment, when a touch applied to one point of the display unit in the state in which the first cursor is activated continuously moves in a first direction, the controller may activate the second cursor.

In one exemplary embodiment, when the second cursor is activated, the virtual keypad may be switched to a debugging pad related to the second cursor. The debugging keypad may include one or more keys not included in the virtual keypad, and the one or more keys may include one or more keys related to a function formed to execute a function for correcting the typo.

In one exemplary embodiment, the controller may display at least one recommendation word replaceable for the typo at a position adjacent to the second cursor.

In one exemplary embodiment, when a typo is included in a text input by the user, the controller may display information related to the typo on the virtual keypad.

In one exemplary embodiment, the first cursor may move to a position at which a new character is to be input as characters are input, and the second cursor may start moving later than the first cursor and sequentially move along the place where the first cursor passes.

In one exemplary embodiment, the moving speed of the second cursor may be changed depending on a position where the second cursor is displayed.

In one exemplary embodiment, the second cursor may move at a first speed when the typo is included at the position where the second cursor is displayed, and move at a second speed when the typo is not included. The first speed may be slower than the second speed.

In one exemplary embodiment, when the second cursor is activated, the movement of the second cursor may be stopped.

In one exemplary embodiment, when the editing mode is executed, a cursor movement icon formed to move the second cursor may be displayed on the display unit. The controller may move the second cursor in response to a touch applied to the cursor movement icon.

In one exemplary embodiment, the controller may move the second cursor for each word based on a touch applied to the cursor movement icon.

In one exemplary embodiment, the controller may display a plurality of guidance bars for guiding a position at which the second cursor is to be moved. The second cursor may be displayed at the position of any one of the plurality of guidance bars.

In one exemplary embodiment, when a search command with respect to a search word is applied, the controller may search a word similar to the search word in a text input by the user. When one or more similar words are searched, the controller may execute the editing mode, and display sub-cursors respectively at positions corresponding to the searched one or more words. The second cursor is any one of the sub-cursors.

In one exemplary embodiment, when a touch applied to one point of the first area continuously moves in the first direction, the controller may convert the mode of the mobile terminal into a standby state for executing the editing mode. When a touch is applied to the second area in the standby state, the controller may execute the editing mode, and display the second cursor at the point where the touch is applied to the second area.

In one exemplary embodiment, when at least one typo is included in a text input by the user, the controller may display a typo list including at least one typo item in one area of the display unit. When a touch is applied to any one typo item in the typo list, the controller may execute the editing mode, display the second cursor at a position corresponding to the typo item, and activate the second cursor.

In one exemplary embodiment, when the editing mode is executed, the controller may output notification information for notifying that the second cursor is displayed using at least one of visual, tactile and auditory manners.

To achieve these and other advantages and in accordance with the purpose of this specification, as embodied and broadly described herein, a method for controlling a mobile terminal, the method includes: displaying a virtual keypad and a first cursor for guiding the position of a character to be input by a touch applied to the virtual keypad; displaying, on a display unit, a second cursor different from the first cursor, when an editing mode is executed in the state in which the first cursor is displayed; selectively activating any one of the first and second cursors based on a user input; and displaying a character corresponding to the at least one key at the activated one of the first and second cursors, when a touch is applied to at least one of a plurality of keys included in the virtual keypad.

The mobile terminal and the control method thereof according to the present disclosure have advantages as follows.

According to exemplary embodiments, the mobile terminal can display the first or second cursor as the editing mode is executed. Accordingly, the user can selectively activate any one of the first and second cursor, so that it is unnecessary to directly move a cursor by touching a point to be corrected. Thus, user convenience is improved.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 2 is a conceptual diagram representatively illustrating a control method of the mobile terminal according to an exemplary embodiment;

DETAILED DESCRIPTION OF EXEMPLARY EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A terminal in the present description may include a mobile terminal such as a portable phone, a smart phone, a notebook computer, a digital broadcasting terminal, Personal Digital Assistants (PDA), Portable Multimedia Player (PMP), a navigation system, a slate PC, a tablet PC, an ultra book, a wearable device (e.g., smart watch), a glass-type terminal (e.g., smart glass), a head mounted display (HMD), etc.

However, it will be obvious to those skilled in the art that the present invention may be also applicable to a fixed terminal such as a digital TV, a desktop computer and a digital signage, except for specific configurations for mobility.

Figure 1A:
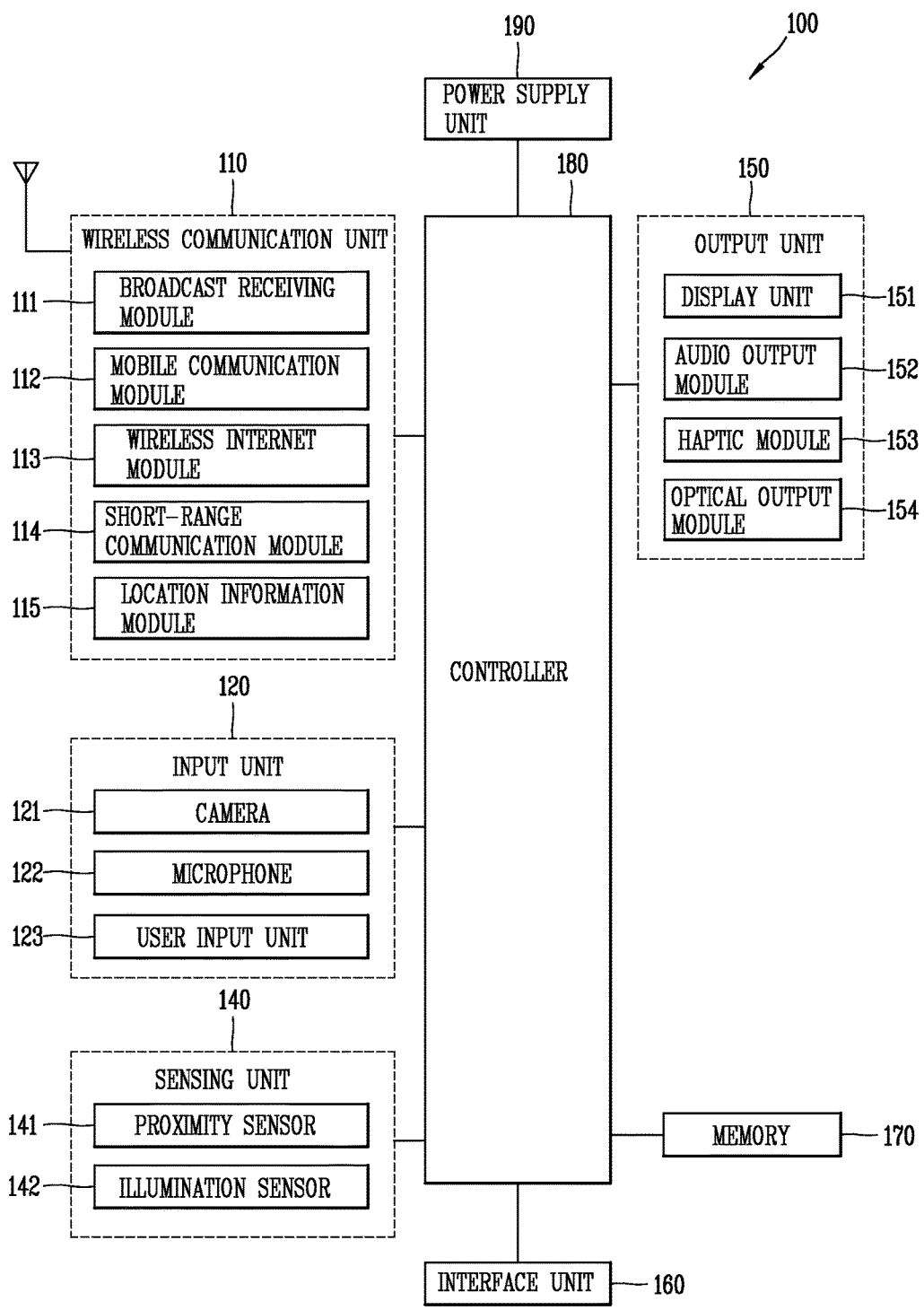
FIG. 1A is a block diagram illustrating a mobile terminal according to an exemplary embodiment.
Figure 1B:
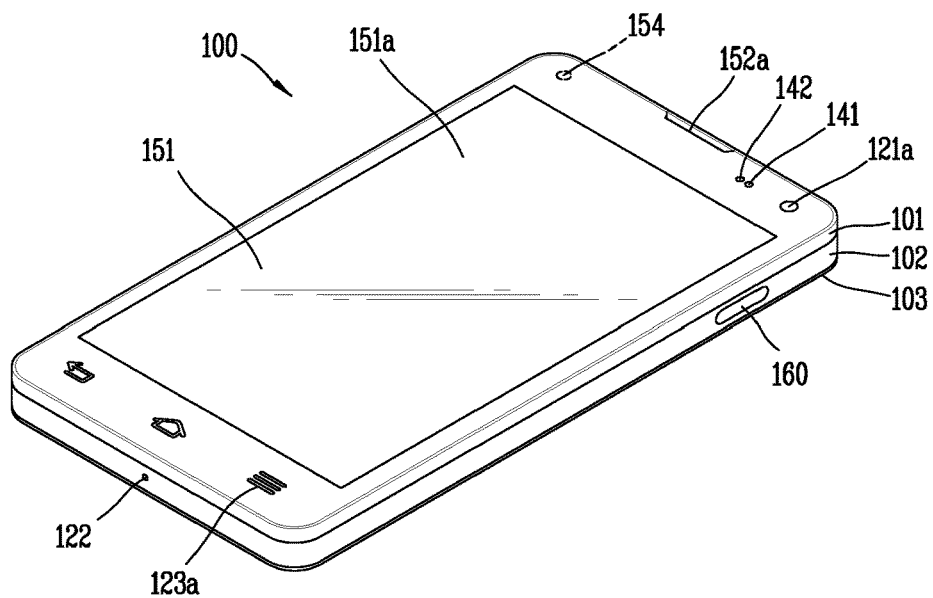
FIGS. 1B and 1C are conceptual diagrams illustrating an example of the mobile terminal viewed in different directions according to the exemplary embodiment.
Figure 1C:
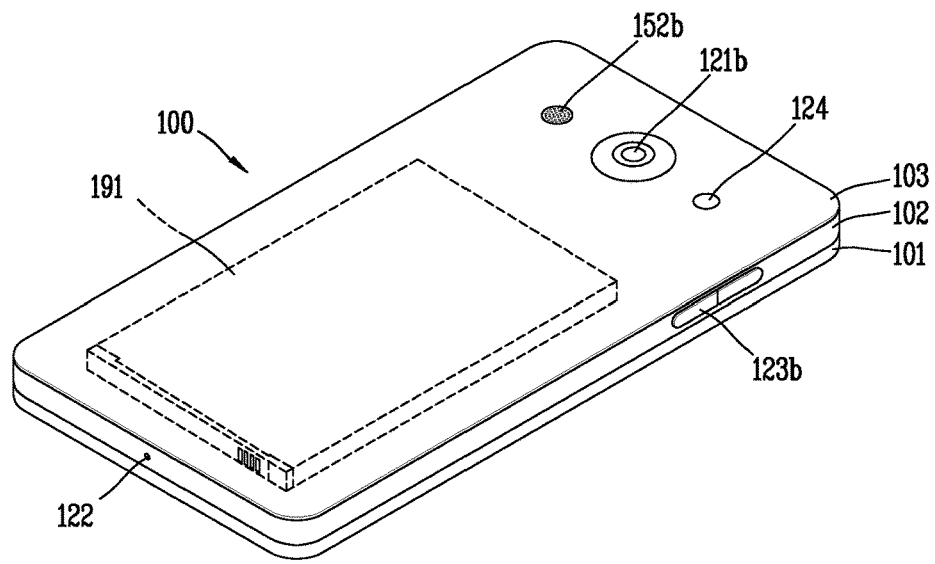

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components of FIG. 1A is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

The display unit 151, the first audio output module 152*a*, the second audio output module 152*b*, the proximity sensor 141, the illumination sensor 142, the optical output module 154, a first camera 121*a*, a second camera 121*b*, the first manipulation unit 123*a*, the second manipulation unit 123*b*, the microphone 122, the interface 160, etc. may be provided at the mobile terminal 100.

As shown in FIGS. 1B and 1C, the display unit 151, the first audio output module 152*a*, the proximity sensor 141, the illumination sensor 142, the optical output module 154, the first camera 121*a* and the first manipulation unit 123*a* are arranged on a front surface of the terminal body. The second manipulation unit 123*b*, the microphone 122 and the interface 160 are arranged on side surfaces of the terminal body. And the second audio output module 152*b* and the second camera 121*b* are arranged on a rear surface of the terminal body.

However, it is to be understood that alternative arrangements are possible and within the teachings of the instant disclosure. Some components may be omitted or rearranged. For example, the first manipulation unit 123*a* may be located on another surface of the terminal body, and the second audio output module 152*b* may be located on the side surface of the terminal body.

The display unit 151 outputs information processed in the mobile terminal 100. The display unit 151 may be implemented using one or more suitable mobile terminals. Examples of such suitable mobile terminals include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two mobile terminals, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver, and the second audio output module 152b may be implemented in the form of a loud speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may be implemented in a user's non-tactile manner, e.g., by a proximity touch, a hovering touch, etc.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, a communication system which is operable with the mobile terminal 100 according to the present disclosure will be described.

Such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like.

By way of non-limiting example only, further description will relate to a CDMA communication system, but such teachings apply equally to other system types including the CDMA wireless communication system.

A CDMA wireless communication system is shown having a plurality of mobile terminals 100, a plurality of base stations (BSs), base station controllers (BSCs), and a mobile switching center (MSC). The MSC is configured to interface with a conventional Public Switch Telephone Network (PSTN). The MSC is also configured to interface with the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 (FIG. 1A) is typically configured inside the mobile terminal 100 to receive broadcast signals transmitted by the BT.

Global Positioning System (GPS) satellites 300 facilitate locating the position of at least one of plural mobile terminals 100. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

The display unit 151 will be again described. In the present disclosure, characters (or symbols) input by a user are displayed on the display unit 151. More specifically, characters input by the user are displayed in real time on the display unit 151. A cursor is displayed at one point of the display unit 151, to guide the user to the position at which a character will be input.

In this state, the user may input a character at the position where the cursor is displayed. More specifically, the user may input a character by applying a touch to a virtual keypad displayed on the display unit, or input a character using an input means connected by wire or wireless to the mobile terminal. Hereinafter, for convenience of illustration, an operation of inputting characters using a virtual keypad will be described as an exemplary embodiment, but the present invention is not limited thereto. That is, characters may be input by an input means such as a keyboard connected by wire or wireless to the mobile terminal, instead of the virtual keypad.

Meanwhile, as characters are input by the virtual keypad, a text is displayed in one area of the display unit. Here, the text means a body as information configured with characters input in the mobile terminal. For example, the entire contents of characters input on an input window of a character message or the entire contents of a memo input on one memo window in a memo application may be the text.

When the amount of information corresponding to the text is little, the entire information is displayed in at least one area of the display unit. However, when the amount of the information is more than that of information, which can be displayed on one screen, partial information is displayed on the display unit. When partial information of the text is displayed, the user may identify the other information using a scroll function.

Meanwhile, when a typographical error (typo) is included in a text, the user necessarily corrects or deletes the corresponding typo by moving a cursor at the position of the text including the typo. However, it is difficult to touch the exact point of the typo at a time, and there is an inconvenience in that the cursor should be again moved to the original point after the corresponding typo is corrected. Hereinafter, specific methods for solving this problem will be described in detail with reference to the accompanying drawings.

FIG. 2 is a conceptual diagram representatively illustrating a control method of the mobile terminal according to an exemplary embodiment.

First, a virtual keypad and a first cursor for guiding a position at which a character is to be input are displayed (S210). The display unit has a first area for displaying the virtual keypad and a second area for displaying a character input by a touch applied to the virtual keypad. The first cursor for guiding the position at which the character is to be input is displayed at one point of the second area.

Next, if an editing mode is executed, a second cursor is displayed (S230). That is, if the editing mode is executed, the second cursor is displayed together with the first cursor in the second area.

Here, the editing mode is a function executed when a condition set to display the second cursor is satisfied in the mobile terminal according to the present disclosure. The editing mode means a state in which the first cursor and the second cursor different from the first cursor are displayed at the same time.

As an example, when a typo is included in a text input by the user, the editing mode may be executed. When the editing mode is executed by a typo, a second cursor is displayed at a position corresponding to the typo. In addition to the second cursor, cursors including a third cursor, a fourth cursor and the like may be displayed at positions of typos respectively corresponding thereto, based on the number of the typos included in a text.

When the editing mode is executed by a typo, the controller may search at least one recommendation word with which the typo is replaceable, and display the searched recommendation word at a position adjacent to the second cursor. If a touch is applied to the recommendation word displayed on the display unit, the controller can replace the typo with the recommendation word to which the touch is applied.

As another example, when an operation of pushing the virtual keypad from the right to the left (or from the left to the right) is input, the editing mode may be executed. More specifically, when an operation of pushing a first virtual keypad to a side is sensed in a state in which the first virtual keypad corresponding to the first cursor is displayed, the editing mode is executed. If the editing mode is executed by the operation of pushing the first virtual keypad to the side, a second cursor and a second virtual keypad corresponding to the second cursor are displayed. The first virtual keypad is switched to the second virtual keypad, and the first cursor is non-activated. Instead of the first cursor, the second cursor is activated. In the same manner, when an operation of pushing the second virtual keypad to the side is sensed, the second virtual keypad is switched to the first virtual keypad, and the second cursor is non-activated. Instead of the second cursor, the first cursor is activated. Here, the operation of pushing the virtual keypad to the side means an operation in which a touch applied at one point of the area in which the virtual keypad is displayed continuously moves in a first direction. There may be provided a user interface for switching a virtual keypad through an operation of pushing the virtual keypad to the side and displaying, on the display unit, a new cursor corresponding to the switched virtual keypad.

As still another example, if the operation of pushing the virtual keypad to the side is sensed, the state of the mobile terminal is converted into a standby state. If a touch is applied at one point of the second area in which a text is displayed in the standby state, the editing mode is executed, and a second cursor is displayed at the point where the touch is applied in the second area. That is, the point at which the second cursor is to be displayed may be selected by the user.

As still another example, when a search command for a specific word is applied, the editing mode may be executed. More specifically, when a search command for a search word is applied by the user, the controller searches a similar word similar to the search word (or a correspondent word corresponding to the search word) in a text. When a similar word (or a correspondent word) is searched, the editing mode is executed, and a second cursor is displayed at a position corresponding to the searched word. When a plurality of words are searched, a third cursor, a fourth cursor, and the like may be displayed at positions corresponding to the respective searched words. The user corrects the searched word by activating the second cursor, etc., and the first cursor is activated after the correction is completed, to return to the position at which the character was previously input.

As still another example, when a backspace formed to delete a relative character by moving a cursor one step to the left is continuously activated plural times, the editing mode may be executed. More specifically, when a plurality of characters are continuously deleted, the editing mode is executed. In this state, the first cursor is displayed at a position before the deletion is started, and a second cursor, a third cursor, and the like may be at different positions, based on the quantity of words to be deleted.

An exemplary embodiment will be described using a text called "To be or not to be, that is the question". In a state in which the first cursor is positioned at the right of the last character "n" in "question", characters called "is the question" may be continuously deleted in reverse of the order in which the characters are described. This is a case where characters of a predetermined number are continuously deleted, and therefore, the editing mode is executed. In this state, the first cursor is continuously positioned at the right of the last character "n" in "question". A second cursor may be displayed at the right of the last character "t" in "To be or not to be, that". The user may add new contents using the second cursor, and then recover characters that were deleted using the first cursor. In order to improve user's convenience, different forms may be applied to the deleted characters and non-deleted characters. The different forms mean that sizes, thicknesses, styles and the like of characters are different.

As still another embodiment, the editing mode may be set to a basic option. When the editing mode is set to the basic option, the first cursor moves to a position at which a new character is to be input as characters are input, and a second cursor starts moving later than the first cursor and sequentially moves along the place through which the first cursor passes. That is, the first cursor moves corresponding to a typing speed, but the second cursor moves with a time difference from the first cursor.

When the second cursor moves with a time difference from the first cursor, the moving speed of the second cursor is changed depending on a position at which the second cursor is displayed. More specifically, when a typo is included at the position where the second cursor is displayed, the second cursor moves at a first speed. When any typo is not included, the second cursor moves at a second speed faster than the first speed. The user watches the movement of the second cursor, to identify whether any typo exists in a text input by the user. When the second cursor passes through a position at which a character is to be corrected, the user may stop the movement of the second cursor and activate the second cursor, thereby adding or deleting a character at the position where the second cursor is displayed.

Meanwhile, if the editing mode is executed, the controller outputs a notification information for notifying that the second cursor is displayed using at least one of visual, tactile and auditory manners. For example, if the editing mode is executed, the controller may notify that the second cursor is displayed by flickering the light output unit 154 disposed at the front of the terminal body for a reference number of times.

Next, any one of the first and second cursors is activated (S250). Then, a character is input to the activated one of the first and second cursors (S270). That is, a character input by the virtual keypad is input at the position of the activated one of the first and second cursors.

As an example, if a touch is applied at a position closer to the second cursor than the first cursor, the second cursor may be activated. If a touch is applied at a position closer to the first cursor than the second cursor, the first cursor may be activated. As another example, if a touch applied to one point of the area in which the virtual keypad is displayed continuously moves in the first direction in the state in which the first cursor is activated, the second cursor may be activated. That is, if an operation of pushing the virtual keypad is applied, another cursor is activated.

In addition, if the editing mode is executed, a cursor selection icon formed to selectively activate any one of the first and second cursors may be displayed on the display unit. The controller activates any one of the first and second cursors based on a touch applied to the cursor selection icon. The first or second cursor is selectively activated by the method described above, and hence the user can quickly the cursor. The user can easily search the position at which the first or second cursor is displayed, using the cursor selection icon.

When the activated cursor is switched from the first cursor to the second cursor, the virtual keypad related to the first cursor may be switched to a debugging keypad related to the second cursor. The debugging keypad has keys formed to input a new character at the position where the second cursor is displayed or correct a character that has been input, and includes one or more keys not included in the virtual keypad. The one or more keys are formed to execute a function for correcting typos. The function for correcting typos, for example, may be a replacement function for replacing a word that has been input with a recommendation word, an erasing function capable of erasing a plurality of characters through a one-time drag input, or the like.

Meanwhile, in order to clearly guide the position at which a character is input, if any one of the first and second cursors is activated, the activated one is highlighted to be distinguished from the other. For example, a graphic object for flickering the activated one in a predetermined period or guiding the activation at a position adjacent to the activated one may be displayed on the display unit.

Meanwhile, the editing mode is executed, the controller may display, on the display unit, a cursor movement icon formed to move the second cursor. More specifically, the controller the cursor movement icon at one point of the display unit, corresponding to the execution of the editing mode, and moves the second cursor in response to a touch applied to the cursor movement icon. For example, when three words are included in a text, the second cursor may move to any one position among a side of the first word, a side of the second word and a side of the third word, in response to a touch applied to the cursor movement icon. That is, the second cursor may move for each word in the text.

When the cursor movement icon is displayed on the display unit, the controller displays a plurality of guidance bars for guiding a position at which the second cursor can move. The second cursor can move to any one position among the plurality of guidance bars, and thus the position at which the second cursor is to move can be exactly guided to the user.

Hereinafter, operations of controlling the mobile terminal according to the control method illustrated in FIG. 2 will be described in detail with reference to the accompanying drawings.

FIGS. 3A to 3D are conceptual diagrams illustrating an operation implemented by the mobile terminal as an example implemented by the control method of FIG. 2 according to an exemplary embodiment.

Figure 3A:
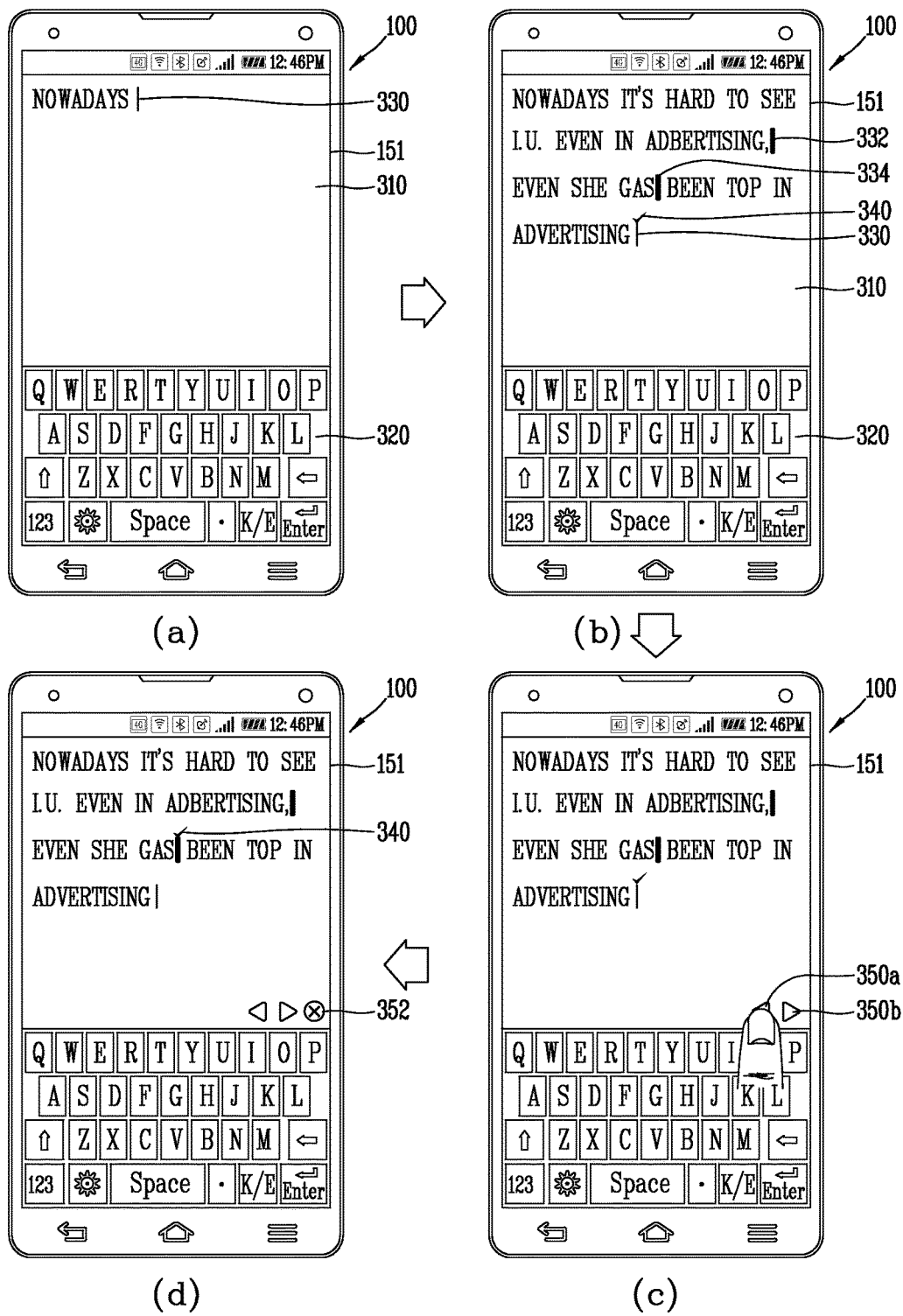
FIGS. 3A to 3D are conceptual diagrams illustrating an operation implemented by the mobile terminal as an example implemented by the control method of FIG. 2 according to an exemplary embodiment.

First, referring to FIG. 3A, various visual information may be displayed on the display unit 151 of the mobile terminal according to the present disclosure. Theses information may be displayed in the forms of characters, numbers, symbols, graphics, icons or the like.

In order to input these information, at least one of the characters, numbers, symbols, graphics and icons are displayed in a predetermined arrangement, to be implemented in the form of a virtual keypad. The virtual keypad may include a plurality of keys so called 'soft keys'.

An output screen of the 'virtual keypad' may be automatically switched in a landscape direction or a portrait direction according to the disposition direction of the terminal main body. For convenience of illustration, a case where the virtual keypad is displayed in the portrait direction will be described in the exemplary embodiment.

The display unit 151 may be operated as the entire area or may be operated by being divided into a plurality of areas. In case of the latter, the plurality of areas may be configured to operate in relation to one another.

For example, as shown in FIG. 3A, an output window 310 (or a first area) and an input window 320 (or a second area) are displayed at upper and lower portions of the display unit 151, respectively. Each of the output and input windows 310 and 320 may be an area assigned for the output or input of information. Soft keys on which symbols for inputting a telephone number, characters, etc. are displayed may be output on the input window 320. If a soft key is touched, a symbol corresponding to the touched soft key is displayed on the output window 310.

The output and input windows 310 and 320 are displayed on the display unit 151, and a plurality of soft keys on which at least one of characters, symbols and numbers are displayed may be arranged in plural numbers on the input window 320.

The areas in which the respective output and input windows are displayed may be changed depending on when the terminal main body is disposed in the portrait direction and when the terminal main body is disposed in the landscape direction.

If a touch is applied to at least one of the plurality of soft keys included in the virtual keypad, a character, number, symbol or the like corresponding to the touched soft key is displayed on the output window 310.

Particularly, a first cursor 330 as a mark representing an input position is displayed on the output window 310. The character, number, symbol or the like corresponding to the touched soft key is input at the position where the first cursor 330 has been displayed, and the first cursor 330 moves one space to the right.

Meanwhile, the controller may decide whether a typo is included in information input by the virtual keypad. More specifically, when new information is input by a touch applied to the virtual keypad, the controller may compare the input information with typos stored in a database and decide whether at least one typo among the stored typos is input. Here, the typo is a word that does not correspond to the spelling rules or a word that has a history that the word was input and then corrected by the user. The typo means a word stored in the database.

When a typo is included in the information, the controller executes the editing mode and displays a second cursor at a position corresponding to the typo. When a plurality of typos are included in the information, a plurality of cursors corresponding to the number of the included typos may be displayed. For example, as shown in FIG. 3A, a second cursor 332 may be displayed at a position corresponding to a first typo ('ADBERTISING,'), and a third cursor 334 may be displayed at a position corresponding to a second typo ('GAS').

Hereinafter, the second cursor, the third cursor and the like, which are additionally displayed as the editing mode is executed, will be referred to as sub-cursors, and the first cursor displayed before the execution of the editing mode will be referred to as a main cursor.

The sub-cursor is displayed at a position corresponding to the typo. Here, the position corresponding to the typo may be a right side of the last character among characters included in the typo, or may be a right side of a character required to be corrected among the characters included in the typo. For example, when a typo called "ADBERTISING," is included, the sub-cursor may be displayed at the right side of "," or may be displayed at the right side of "B" that is a character required to be corrected. For convenience of illustration, in the exemplary embodiment, a case where the sub-cursor is displayed at the right side of the last character among the characters included in the typo will be described in the exemplary embodiment.

Meanwhile, the controller may display the main cursor and the sub-cursor in different colors so that the main cursor is distinguished from the sub-cursor. For example, the main cursor may be displayed in black, and the sub-cursor may be displayed in red. In addition, any one activated cursor among a plurality of cursors may be highlighted so that the activated cursor is distinguished from the other cursors. For example, the activated cursor may flicker at a predetermined period, or a graphic object 340 for guiding the activation of the activated cursor may be displayed at a position adjacent to the activated cursor as shown in FIG. 3A (b).

Meanwhile, when the editing mode is executed, the controller may display, on the display unit 151, a cursor selection icon for helping movement between the cursors. The controller selectively activates any one of the first and second cursors displayed on the display unit 151, in response to a touch applied to the cursor selection icon.

For example, as shown in FIG. 3A, the controller may display a cursor selection icon 350 on the display unit 151 in the state in which as the editing mode is executed, the first cursor 330 corresponding to the main cursor and the second and third cursors 332 and 334 corresponding to the sub-cursors are displayed on the display unit 151. The cursor selection icon 350 includes a first cursor selection icon 350*a* for activating the previous cursor and a second cursor selection icon 350*b* for activating the next cursor. If a touch is applied to the first cursor selection icon 350*a* in a state in which the first cursor 330 is activated, the first cursor 330 is non-activated, and the third cursor 334 is activated. As the activated cursor is changed, the graphic object 340 representing the activation of the activated cursor is displayed adjacent to the third cursor 334.

If the sub-cursor is activated, a cursor deletion icon 352 may also be displayed on the display unit 151. If a touch is applied to the cursor deletion icon 352 in the state in which the sub-cursor is activated, the controller controls the sub-cursor not to be displayed on the display unit 151. When the last sub-cursor that has been displayed on the display unit 151 is deleted, the editing mode is finished.

Although not shown in these figures, a typo may be corrected by a touch applied to the virtual keypad in a state in which a sub-cursor is activated. The controller controls the sub-cursor not to be displayed on the display unit 151 at the same time the typo is corrected, and activates the main cursor. Accordingly, the user can conveniently correct the typo, and return to the position before the typo is corrected.

As described above, when a typo is included in a text, the editing mode is executed so that the sub-cursor is displayed at a position corresponding to the typo. Hence, the user can recognize the fact that the typo has occurred. In addition, characters can be input at different positions by activating any one of the main cursor and the sub-cursor. Hence, it is possible to provide a user interface capable of conveniently moving a point to be edited.

Meanwhile, the controller may change the activated cursor in response to that a predetermined user operation is sensed in the state in which the editing mode is executed.

Figure 3B:
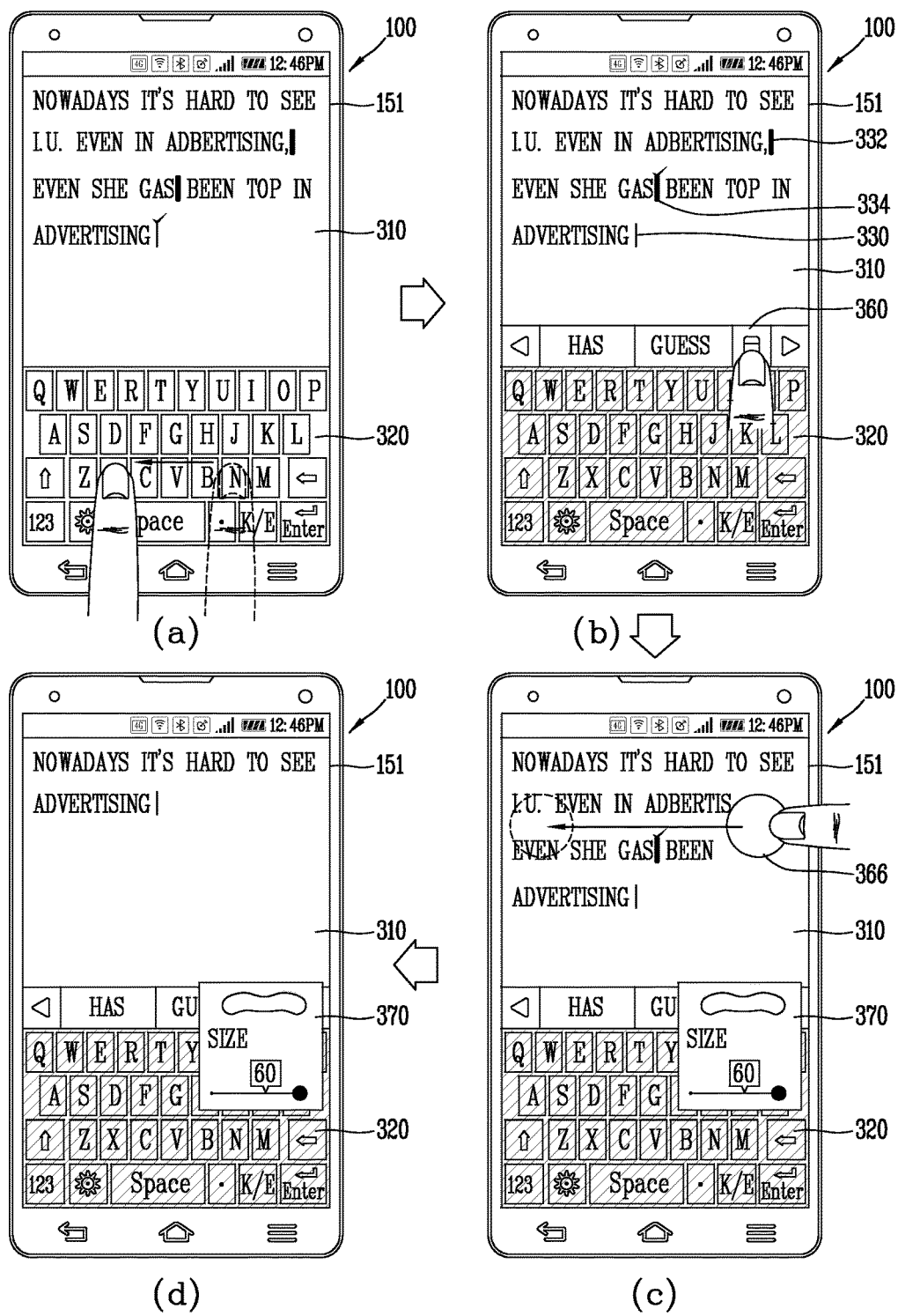

For example, as shown in FIG. 3B, when a touch applied to one point of the input window 320 on which the virtual keypad is displayed continuously moves in a first direction, the controller may activate the third cursor 334 instead of the first cursor 330. In the same manner, when a touch applied to one point of the input window 320 in the state in which the third cursor 334 is activated continuously moves in the first direction, the second cursor 332 may be activated instead of the third cursor 334.

Although not shown in this figure, when a touch applied to one point of the input window 320 in the third cursor 334 is activated continuously moves in a second direction opposite to the first direction, the first cursor 330 may be activated instead of the third cursor 334.

Meanwhile, if a sub-cursor is activated, the virtual keypad that has been displayed on the input window 320 may be switched to a debugging keypad related to the activated sub-cursor. More specifically, the debugging keypad including one or more keys not included in the virtual keypad is displayed on the input window 320. Here, the one or more keys are formed to perform a function for correcting the typo.

For example, at least one recommendation word 362 replaceable for the typo ('GAS') displayed to the left of the activated third cursor 334 may be displayed in the form of a soft key. Although not shown in this figure, when a touch is applied to a key 362a indicated by "HAS", "GAS" is replaced by "HAS".

In addition, the debugging keypad may include various shortcut icons capable of performing functions for editing texts. For example, an eraser icon 360 capable of simultaneously erasing a larger amount of data than that of the backspace may be included in the debugging icon. If a touch is applied to the eraser icon 360, an image 366 for guiding an area in which data are erased is displayed. When the image 366 is moved by the touch, characters that have been displayed at the point where the image 366 passes are deleted.

In addition, shortcut icons corresponding to functions including undo, redo and the like may be included in the debugging keypad.

Figure 3C:
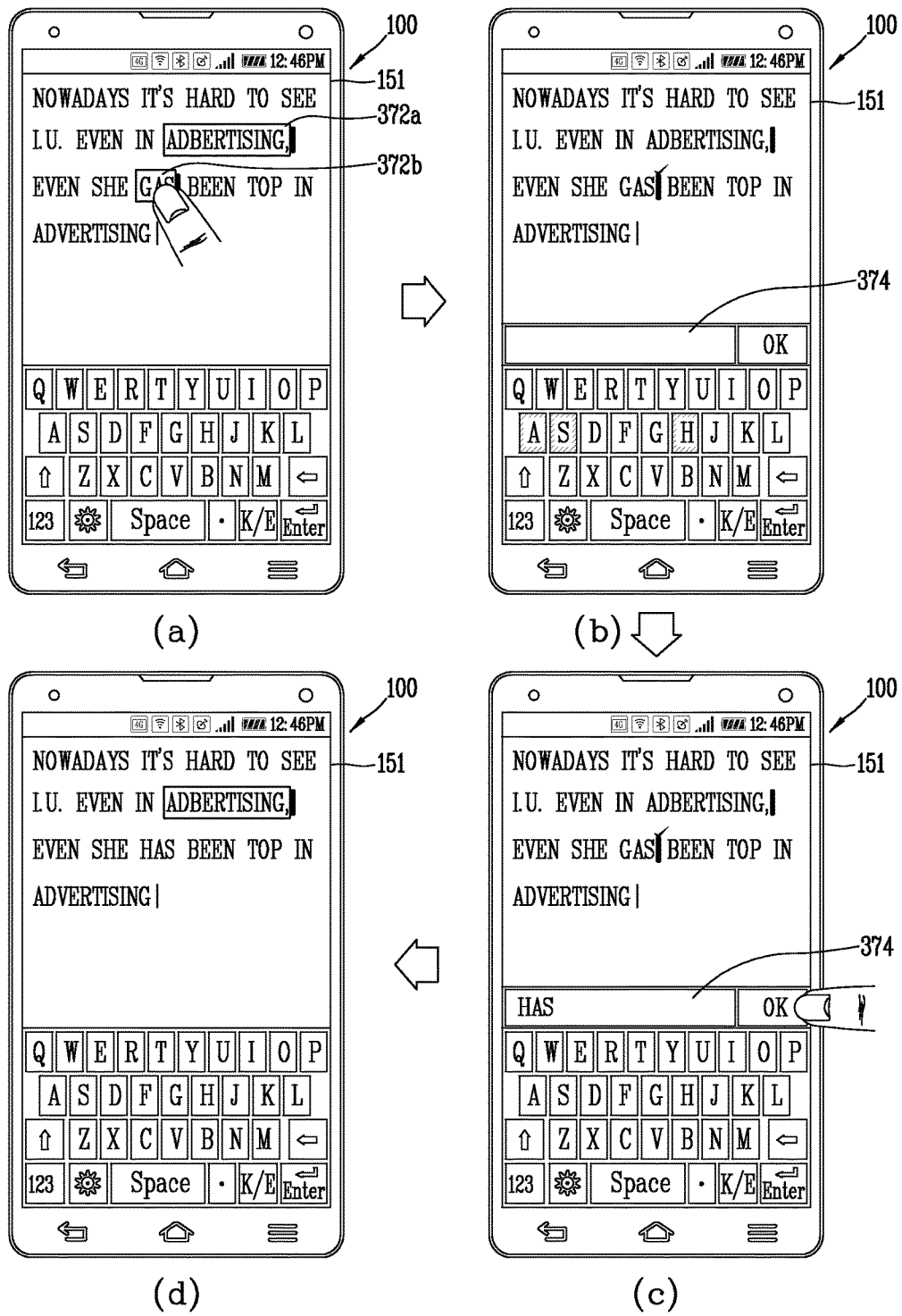

Meanwhile, when a sub-cursor is displayed at a position where a typo is displayed (i.e., when the editing mode is executed), a quadrangular block surrounding the typo may be formed. For example, as shown in FIG. 3C, a first block 372a surrounding the first typo ('ADBERTISING,') and a second block 372b surrounding the second typo ('GAS') may be formed.

If a touch is applied to a specific block, a sub-cursor corresponding to the specific block is activated. That is, the sub-cursor is activated by the touch applied to the block. The user may insert or delete a character at the position where the sub-cursor is displayed, using the virtual keypad. When the typo is normally corrected, the controller releases the block and controls the sub-cursor not to be displayed on the display unit.

The controller may display an input window 374 formed to receive characters input by the user, in response to that the sub-cursor is activated. The input window 374 is used to replace contents included in the specific block. The input window 374 is formed to receive replacement characters input by the user. More specifically, if replacement characters are input on the input window, the contents included in the specific block are replaced with the replacement characters. For example, if "HAS" is input to the input window 374, and a touch is applied to an "OK" button, "GAS" that has been included in the second block 372b is replaced with "HAS". The sub-cursor corresponding to the second typo ('GAS') performs its role, and therefore is no longer displayed on the display unit.

Figure 3D:
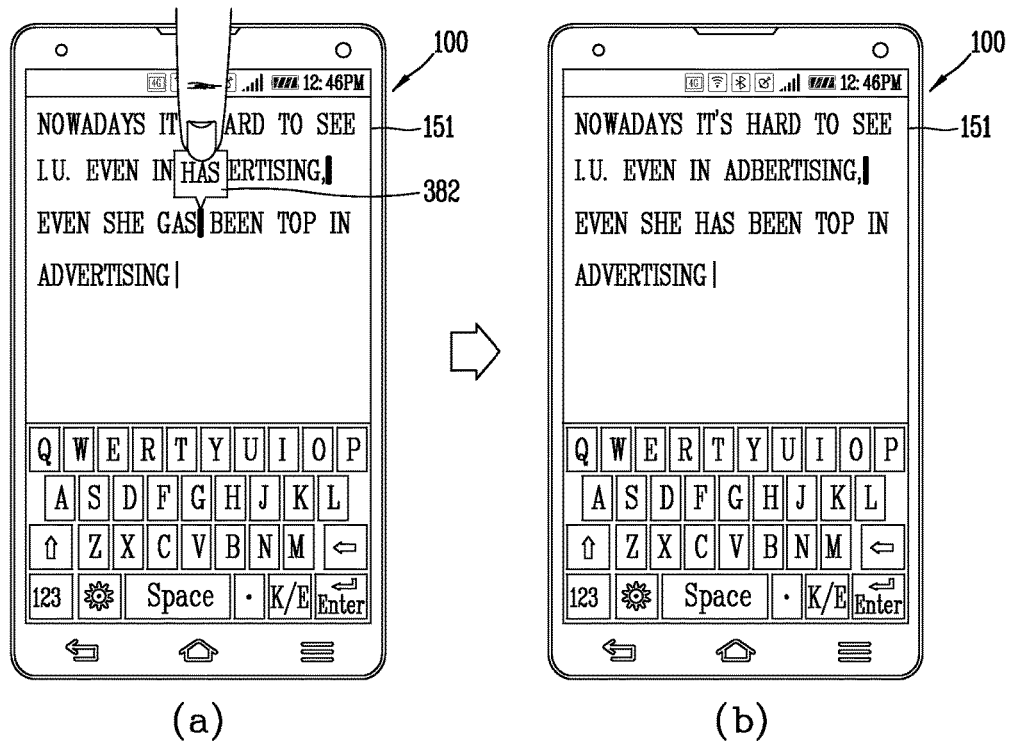

Meanwhile, when the editing mode is executed by a typo in the mobile terminal according to the exemplary embodiment, the controller may display at least one recommendation word replaceable for the typo at a position adjacent to the sub-cursor. For example, as shown in FIG. 3D, a recommendation word ('HAS') 382 replaceable for the typo ('GAS') may be displayed at an upper end of the sub-cursor. If a touch is applied to the recommendation word ('HAS') 382, the typo ('GAS') is replaced with the recommendation word ('HAS') 382. Accordingly, the user can correct typos using a simple method.

Figure 4:
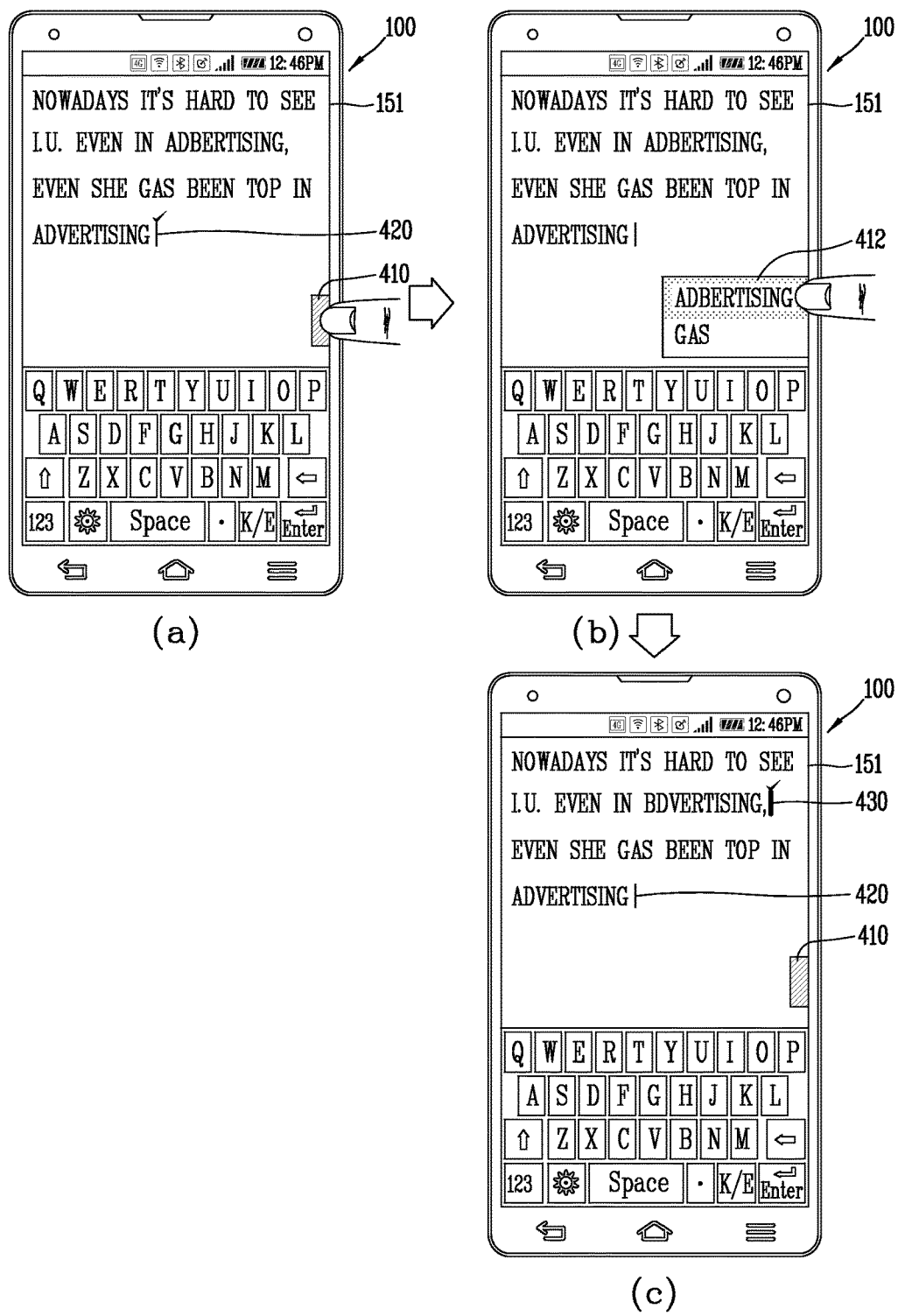
FIG. 4 is a conceptual diagram illustrating an operation of displaying a typographical error (typo) list in the mobile terminal according to an exemplary embodiment.

FIG. 4 is a conceptual diagram illustrating an operation of displaying a typo list in the mobile terminal according to an exemplary embodiment.

According to the exemplary embodiment, the controller may search a typo among words included in a text. More specifically, the controller may decide whether a typo is included in words included in a text, using the database storing words defined as typos.

When at least one typo is included in the text, the controller displays a typo list includes at least one typo item in one area of the display unit 151. For example, when a first typo ('ADBERTISING,') and a second typo ('GAS') are included in a text, the controller displays a typo list 412 including typo items corresponding to the first and second typos.

If a touch is applied to any one of the typo items included in the typo list, the editing mode is executed. More specifically, the controller selects any one of a plurality of typo items included in the typo list, based on the applied touch. The controller displays a second cursor at a position corresponding to the selected one, and activates the second cursor. That is, the second cursor is displayed at a typo selected by the user, and the user may correct the typo using the second cursor. For example, if "ADBERTISING" is selected, a second cursor 430 is displayed at a position corresponding to "ADBERTISING" in the text. In this state, a first cursor 420 is displayed as it is at the position where the first cursor 420 has been displayed before the editing mode is executed in the first cursor 420 is non-activated.

Accordingly, the user can receive a typo list, and execute the editing mode using a simple method. Further, the sub-cursor can be displayed at a typo to be corrected, using the typo list. Hence, where a large number of typos exist, the user can conveniently search and correct typos.

Meanwhile, in the mobile terminal according to the present disclosure, the editing mode may be set to a basic option. The user may allow the editing mode to be activated or non-activated using a menu or the like.

When the editing mode is set to the basic option, the main cursor and the sub-cursor move as characters are input. However, the main cursor and the sub-cursor may move with a time difference. Hereinafter, a sub-cursor moving with a time difference will be described in detail with reference to FIGS. 5A and 5B.

Figure 5A:
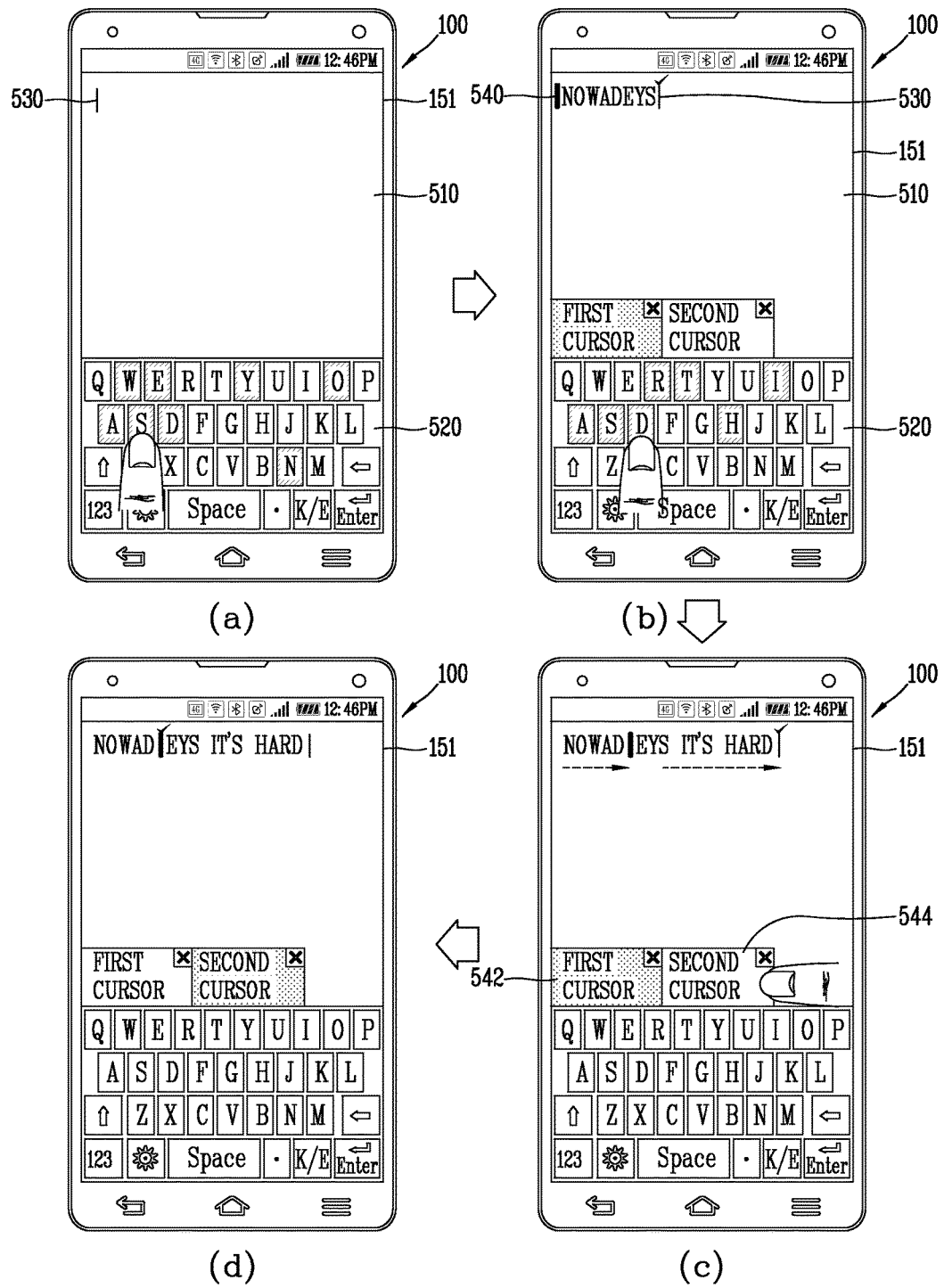
FIGS. 5A and 5B are conceptual diagrams illustrating an operation in which a second cursor moves with a time difference from a first cursor in the mobile terminal according to an exemplary embodiment.
Figure 5B:
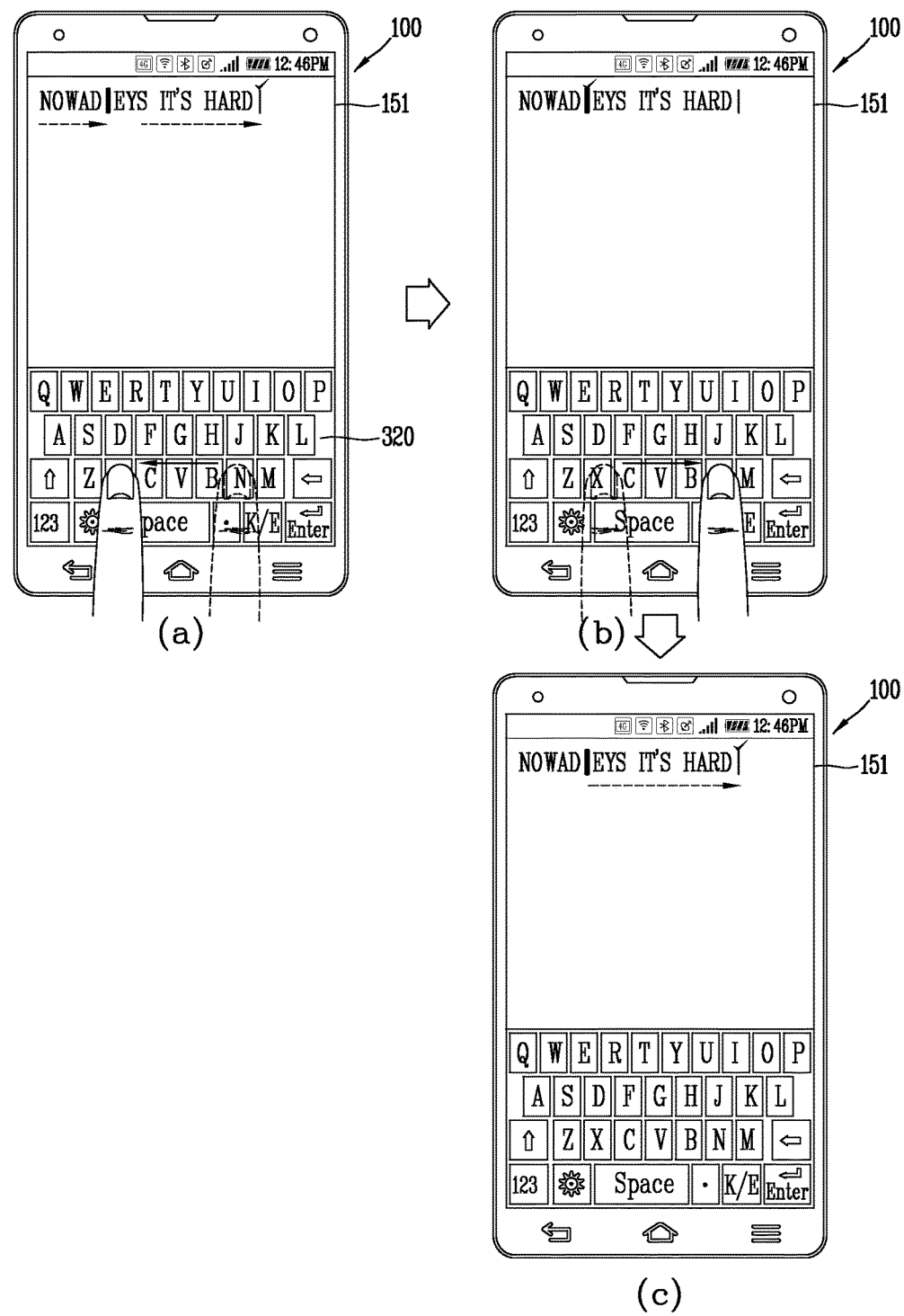

FIGS. 5A and 5B are conceptual diagrams illustrating an operation in which a second cursor moves with a time difference from a first cursor in the mobile terminal according to an exemplary embodiment.

Referring to FIG. 5A, a character is input by a touch applied to an input window 520, and the input character is displayed on an output window 510. A main cursor 530 guiding the position at which a character is to be input moves to a position where a new character is to be input as the character is input. In this state, the main cursor may move for each syllable.

Meanwhile, a sub-cursor 540 starts moving with a predetermined time difference from the main cursor 530. That is, the sub-cursor starts moving when a reference time elapses after the main cursor moves.

In this state, the sub-cursor moves along the point where the main cursor passes. The main cursor moves corresponding to a typing speed, but the sub-cursor moves with a time difference from the main cursor. When typing is stopped, the movement of the main cursor is stopped, but the sub-cursor moves up to the position where the main cursor is displayed.

Meanwhile, the controller may control the moving speed of the sub-cursor to be changed depending on a position where the sub-cursor is displayed. More specifically, when a typo is included at the position where the sub-cursor is displayed, the sub-cursor may move at a first speed. When any typo is not included, the sub-cursor may move at a second speed faster than the first speed. As an example, when the sub-cursor moves for each syllable of "NOWDEYS IT'S HARD", "NOWDEYS" includes a typo, and therefore, the sub-cursor may move at a slow speed. "IT'S HARD" does not include any typo, and therefore, the sub-cursor may move at a speed relatively faster than the slow speed.

As another example, when the distance from the position where the sub-cursor is displayed to the position where the main cursor is displayed is distant from a reference distance, the second cursor moves at a fast speed. When the distance from the position where the sub-cursor is displayed to the position where the main cursor is displayed is close to the reference distance, the sub-cursor may move at a speed relatively slower than the fast speed.

The user can watch movement of the sub-cursor, to identify whether any typo is included in a text input by the user. If the sub-cursor passes a position where a typo is to be corrected, the user can add or delete a character at the position where the sub-cursor is displayed by stopping the movement of the sub-cursor and activating the sub-cursor.

As still another example, when the sub-cursor starts moving, cursor selection icons 542 and 544 formed to selectively activate any one of the main cursor and the sub-cursor may be displayed on the display unit 151. The controller activates any one of the main cursor and the sub-cursor based on a touch applied to the cursor selection icons.

As still another example, as shown in FIG. 5B, when a touch applied to one point of the input window 520 on which the virtual keypad is displayed continuously moves in a first direction, the controller may activate the sub-cursor 540 instead of the main cursor 530. Alternatively, when a touch applied to one point of the input window 520 in the state in which the sub-cursor 540 is activated continuously moves in a second direction opposite to the first direction, the main cursor 530 may be activated instead of the sub-cursor 540.

When the sub-cursor is activated, the movement of the sub-cursor is stopped. However, when the main cursor is activated, the sub-cursor again starts moving up to the position where the main cursor is displayed.

As described above, if a predetermined condition is satisfied, the editing mode can be automatically executed or can be set to the basic option. In addition, the editing mode can be manually executed by the user.

Figure 6:
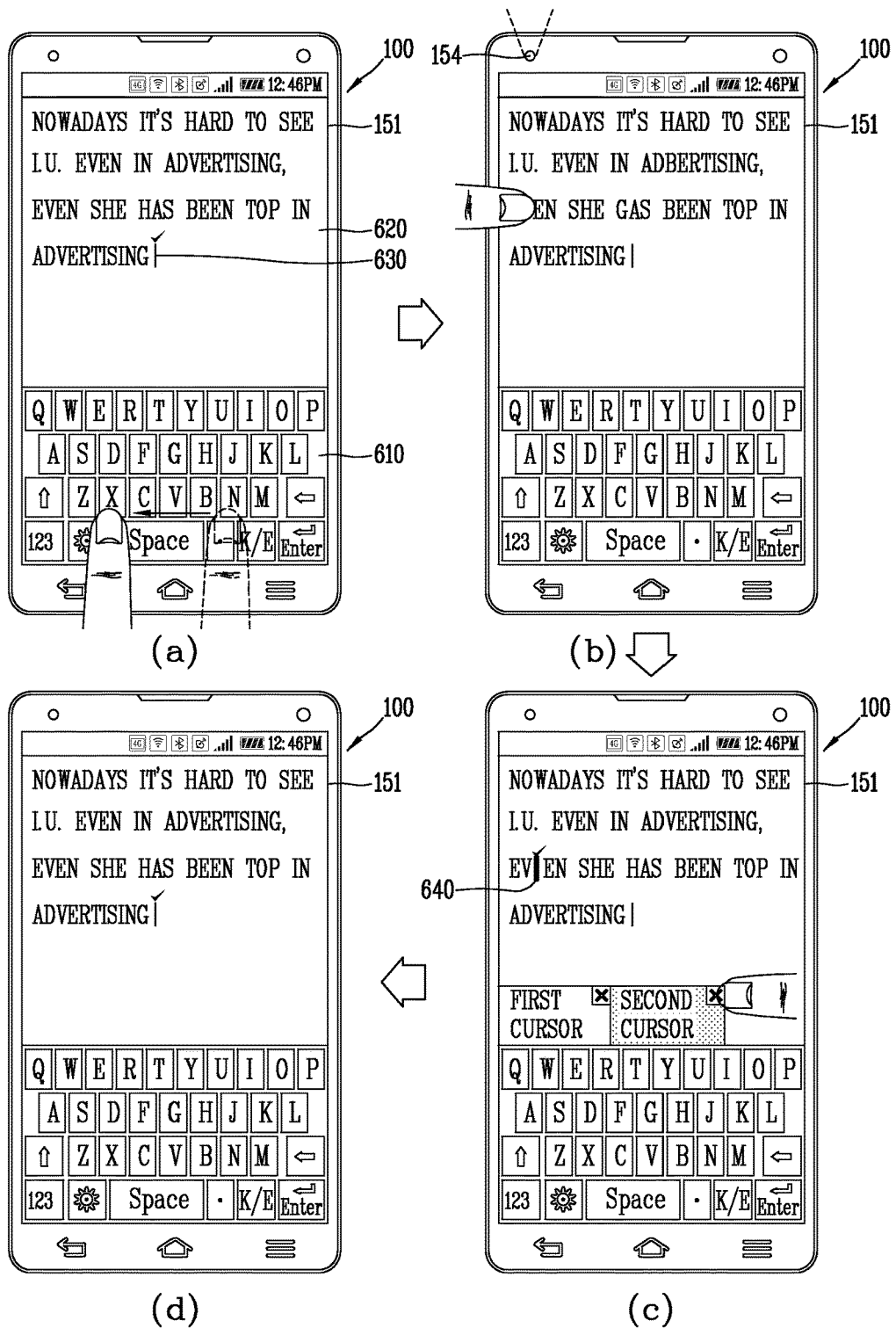
FIGS. 6 and 7 are conceptual diagrams illustrating a process of executing an editing mode in the mobile terminal according to an exemplary embodiment.
Figure 7:
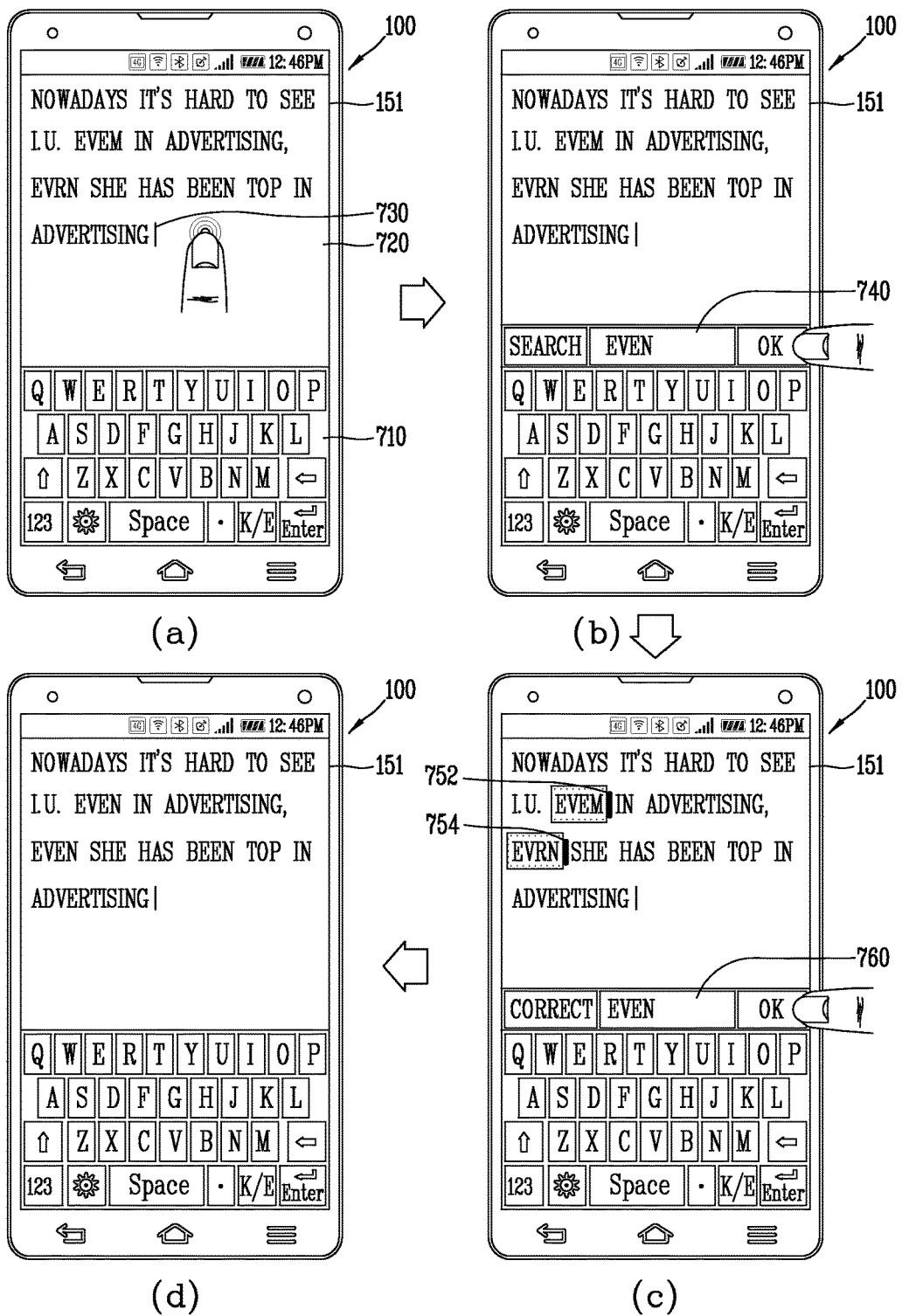

FIGS. 6 and 7 are conceptual diagrams illustrating a process of executing the editing mode in the mobile terminal according to an exemplary embodiment.

Referring to FIG. 6, the mobile terminal according to the exemplary embodiment has the display unit 151 including an input window 610 and an output window 620. In addition, a main cursor 630 is displayed at one point of the output window 620.

If a touch applied to one point of the output window 620 continuously moves in a first direction, the controller executes a standby state for executing the editing mode. In the standby state, a touch for displaying a second cursor is waited. That is, if a touch is applied at one point of the output window 620 in the standby state, the controller executes the editing mode and displays a sub-cursor at the touched point. For example, if a touch is applied in the standby, a sub-cursor 640 may be displayed at the touched point.

The standby state may be executed for a reference time. That is, if a touch is not applied within the reference time, the standby state is finished.

Meanwhile, guidance information for guiding the standby state may be output by the light output unit 154. The light output unit 154 is turned on when the standby state is executed and then flickers gradually faster as the standby state reaches the reference time, thereby guiding that the standby will be finished.

FIGS. 8A to 8D and 9 are conceptual diagrams illustrating an operation of editing a text input using a second cursor in the mobile terminal according to an exemplary embodiment.

As the editing mode is executed, a sub-cursor is displayed together with the main cursor on the display unit. The sub-cursor may be moved by a user input. More specifically, if the editing mode is executed, a cursor movement icon formed to move the sub-cursor is displayed on the display unit. The controller moves the sub-cursor based on a touch applied to the cursor movement icon.

The controller may display a plurality of guidance bars for guiding a position at which the sub-cursor can move. For example, the controller may display guidance bars at fronts and rears of words constituting a text. The sub-cursor is displayed at the position of any one of the plurality of guidance bars. Accordingly, the sub-cursor moves for each word.

According to an exemplary embodiment, the controller executes the editing mode when a backspace function (or a function of deleting characters) is continuously executed a predetermined times by the main cursor. For example, as shown in FIG. 8A, when four characters ('SING') are continuously deleted by a main cursor 810, the editing mode is executed.

When the editing mode is executed, the controller may display the main cursor 810 and a sub-cursor 820 at the same position. The deleted characters may display in gray so that the deleted characters are distinguished from characters that are not deleted.

Figure 8A:
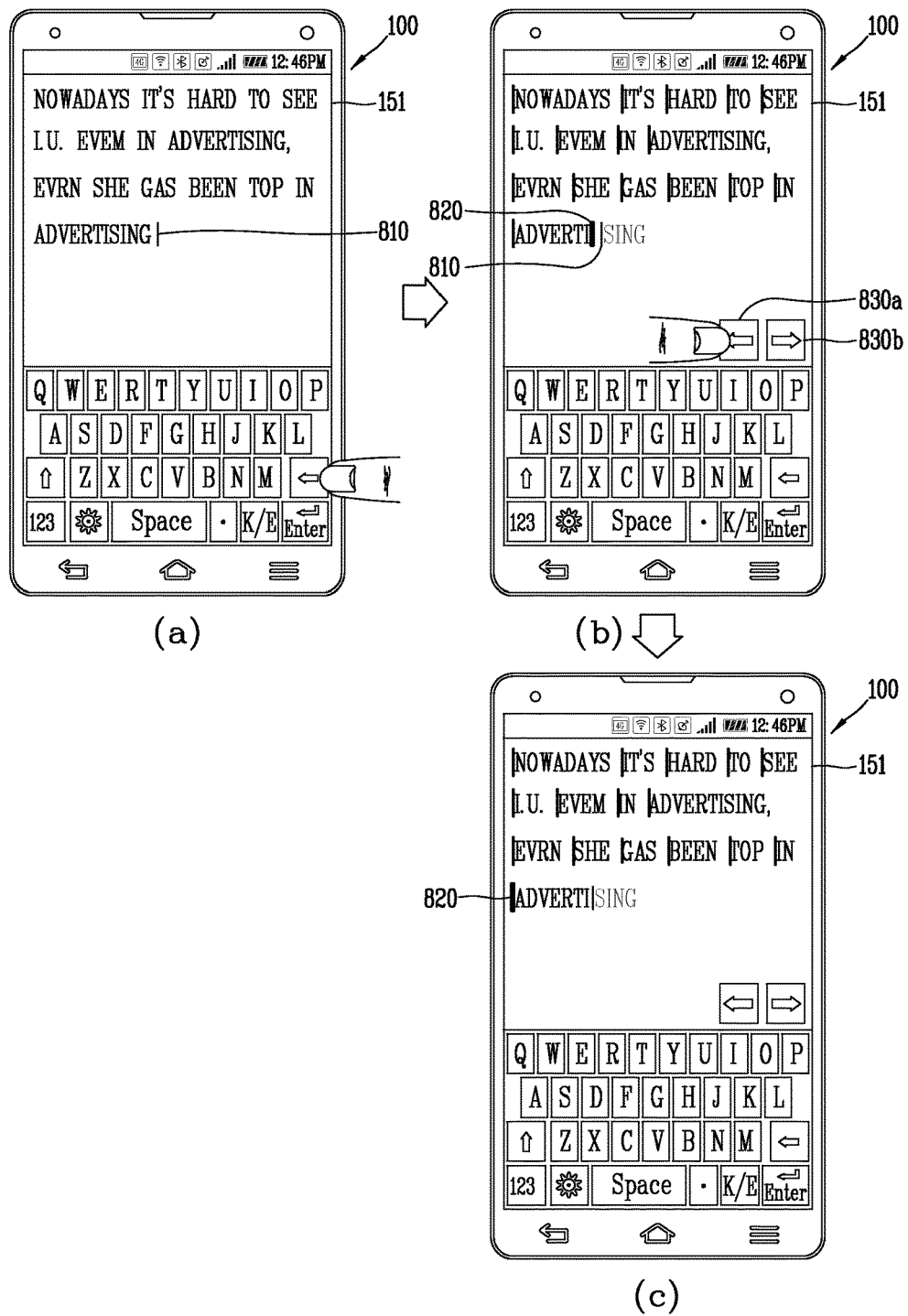
FIGS. 8A to 8D and 9 are conceptual diagrams illustrating an operation of editing a text input using a second cursor in the mobile terminal according to an exemplary embodiment.

As shown in FIG. 8A, the position of the sub-cursor 820 is moved by a touch applied to a cursor movement icon 830*a*.

Figure 8B:
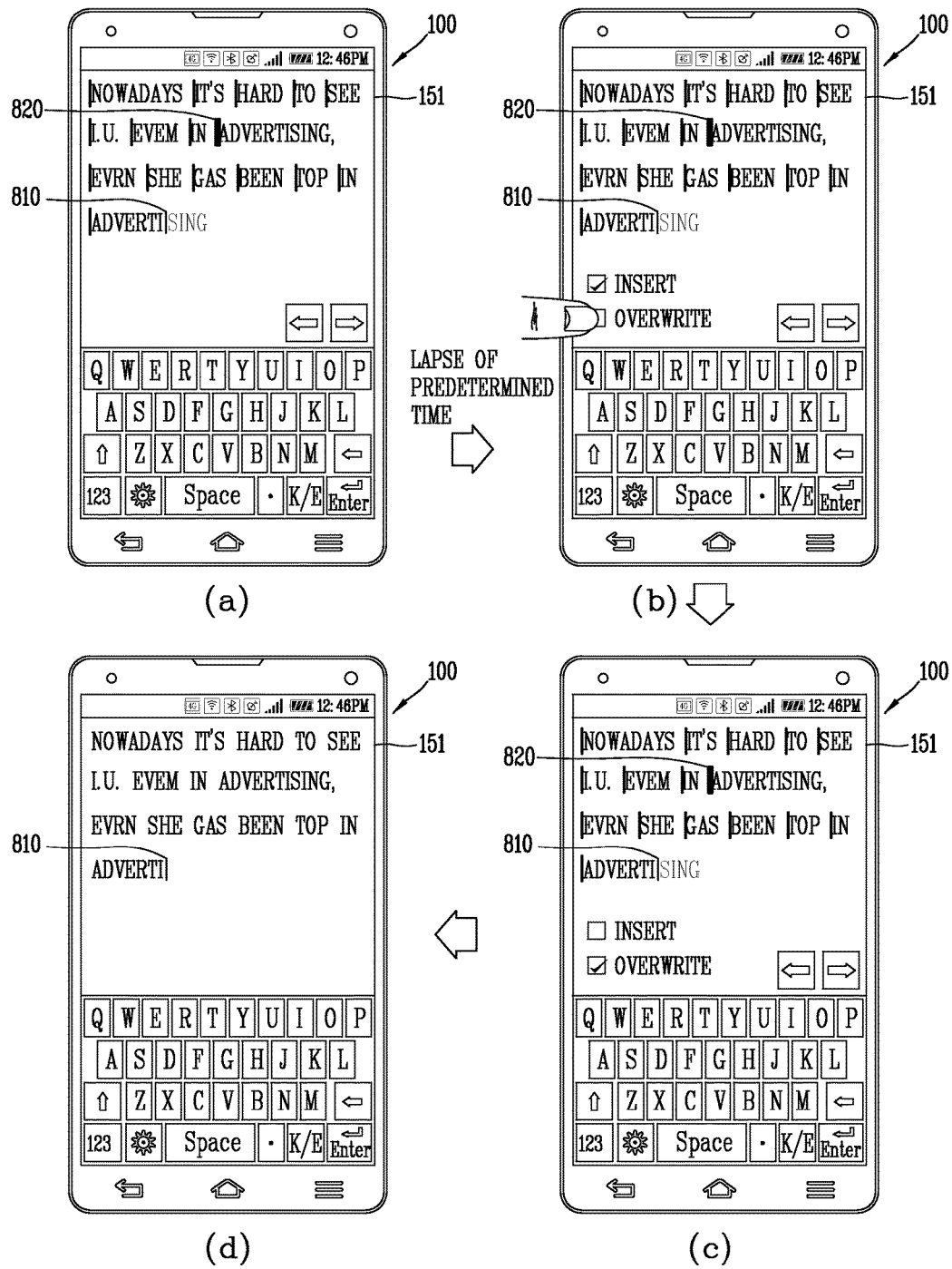

Meanwhile, referring to FIG. 8B, if the editing mode is executed, and a predetermined time elapses, a graphic object capable of selecting on (overwrite) or off (insert) of an overwriting mode may be displayed on the display unit 151. If the overwriting mode is activated, the existing data are replaced with new data. If the overwriting mode is non-activated, new data are added at the point where the cursor is positioned.

Figure 8C:
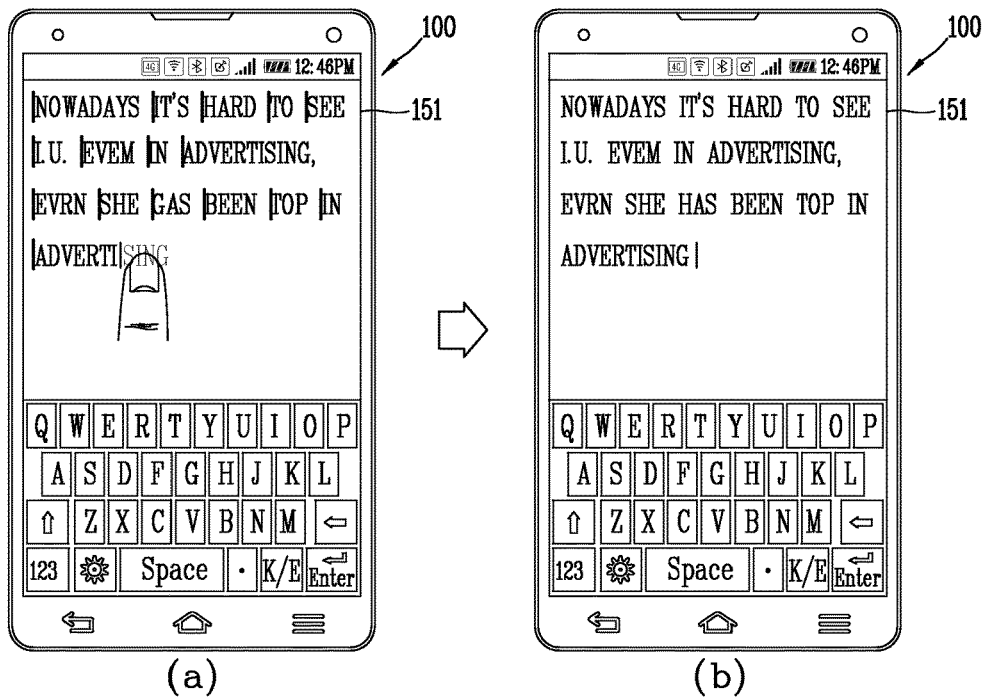

Meanwhile, referring to FIG. 8C, if a touch is applied to any one of the deleted characters ('SING'), the editing mode is finished so that the second cursor disappears on the display unit 151, and the deleted characters are again recovered. The first cursor is displayed at the right side of the last character among the input characters.

Figure 8D:
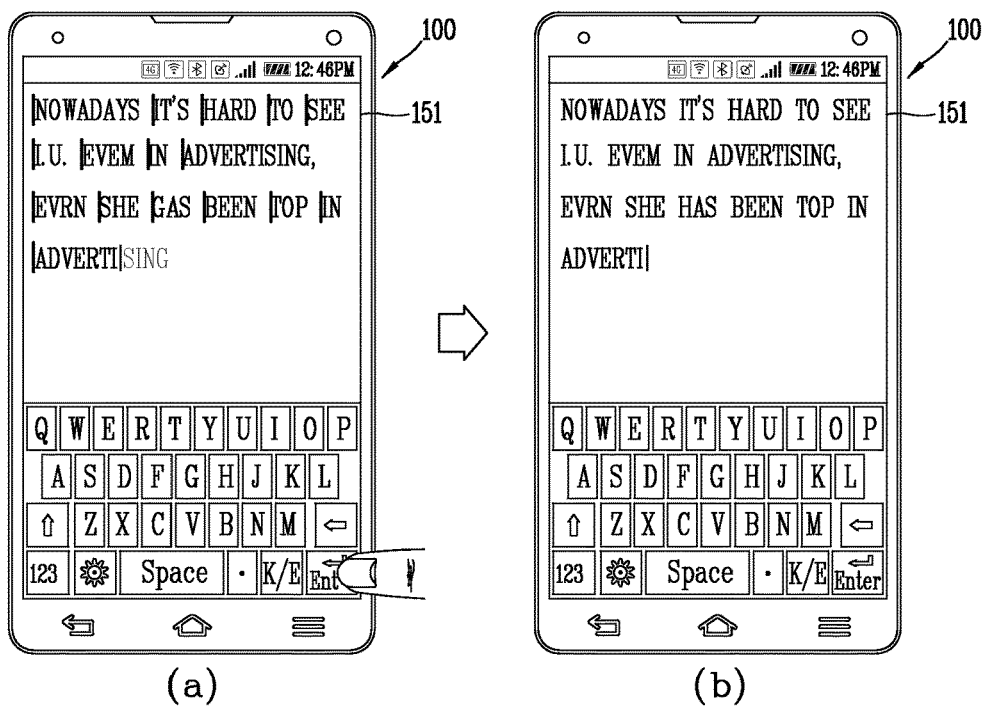

Alternatively, referring to FIG. 8D, if a user input with respect to an enter key is sensed in the editing mode, the controller may erase the deleted characters and simultaneously finishes the editing mode. Accordingly, the second cursor disappears on the display unit 151, and the first cursor is displayed at the right side of the last character among the input characters.

Figure 9:
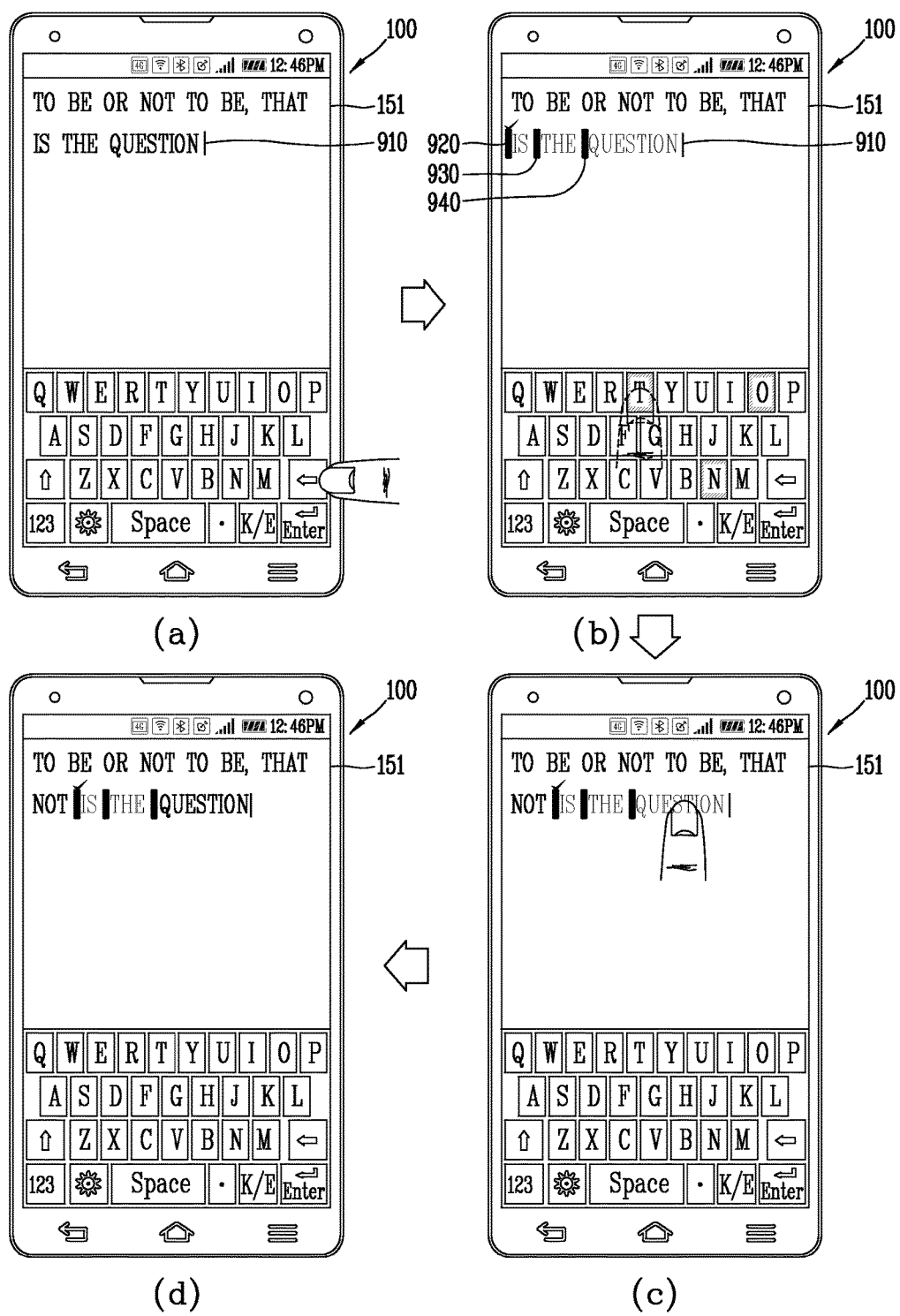

Meanwhile, referring to FIG. 9, as a touch is applied to a deletion button, the input characters ('IS THE QUESTION') are deleted in proportion to the time when the touch is applied. Since four or more characters are deleted, the editing mode is automatically executed. As the editing mode is executed, the deleted characters are distinguished from characters that are not deleted. The controller may display a plurality of guidance bars 920, 930 and 940 for guiding a position at which the sub-cursor can move between the delete characters.

A first cursor 910 may be displayed at the right side of the last character among the input characters, and a second cursor may be displayed at any one of the plurality of guidance bars based on a user input. If characters called "NOT" are input in the state in which the second cursor is displayed, the characters are sequentially input at the position where the second cursor is displayed.

Meanwhile, the deleted characters may be selectively recovered. More specifically, if a touch is applied to at least one of the deleted characters, the deleted characters are converted into a state in which the deleted characters are not deleted. For example, if a touch is applied to "QUESTION" in a state in which "IS THE QUESTION" are deleted, the controller maintains "IS THE" in the deletion state, and "QUESTION" is converted from the deletion state into a state in which the deletion characters are not deleted. Accordingly, the user can conveniently recover the deleted characters.

Figure 10:
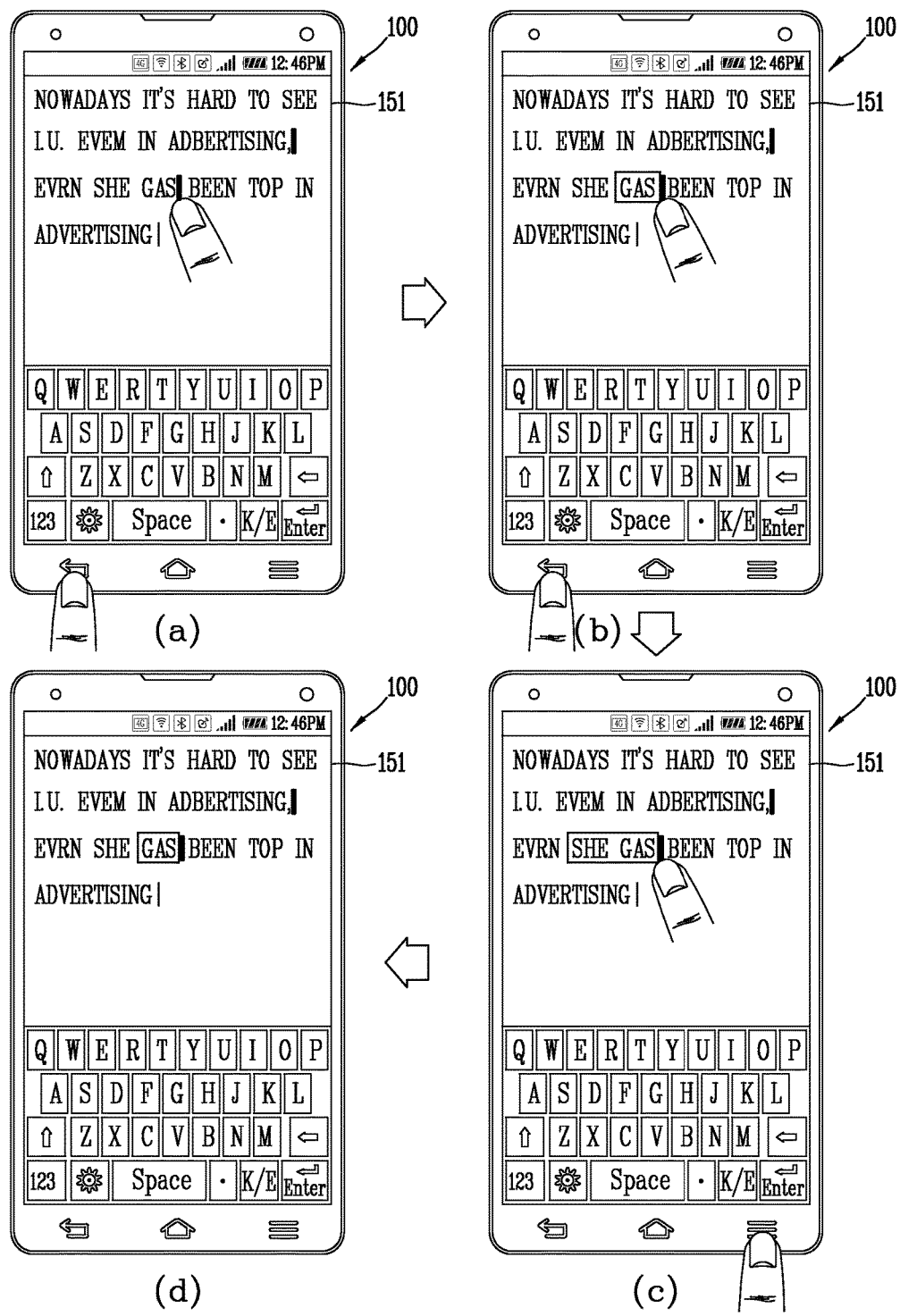
FIG. 10 is a conceptual diagram illustrating an operation of setting a block in the mobile terminal according to an exemplary embodiment.

FIG. 10 is a conceptual diagram illustrating an operation of setting a block in the mobile terminal according to an exemplary embodiment.

In order to set a block in the mobile terminal, it is required to precisely apply a touch. For example, considerable effort and patience are required to set a block to "CD" in a text call "ABCDEFG". However, in the mobile terminal according to the exemplary embodiment, a block can be set using a simple method.

The method for setting the block is performed in the following order. A long touch is applied at a point where a block is to be set. The entire area of the display unit is divided into a left area and a right area based on the point where the long touch is applied (hereinafter, referred to as a 'reference point'). If a touch is applied to the left area in the state in which the long touch is maintained, the area of the block is extended (or reduced) to the left. On the contrary, if a touch is applied to the right area, the area of the block is extended (or reduced) to the right.

In a state in which the user applies a long touch using the middle finger of the right hand, the user may apply a touch using the index finger or thumb of the right hand. The controller may extend (or reduce) the block in the left direction based on the number of touches applied to the left area. For example, referring to FIG. 10, a block is set to "GAS" by a first touch applied to the left area, and subsequently, a block is set to "SHE GAS" by a second touch again applied to the left area.

On the contrary, in the state in which the user applies a long touch using the middle finger of the right hand, the user may apply a touch to the right area using the ring finger or little finger of the right hand. In this case, the controller may extend (or reduce) the block in the right direction based on the number of touches applied to the right area. For example, the block is reduced in the right direction by a third touch applied to the right area in the state in which the block is set to "SHE GAS", so that the block is set to "GAS".

Although not shown in this figure, the entire area of the display unit may be divided into upper and lower ends based on the point at which a long touch is applied. In this case, the block may be extended (or reduced) in the upper end direction by a touch applied to the upper end. The block may be extended (or reduced) in the lower end direction by a touch applied to the lower end.

Meanwhile, the unit where the block is extended or reduced may be any one of a syllable, a word and a sentence.

Although not shown in this figure, if a block is set, and a long touch is released, one or more execution icons related to the set block may be displayed. For example, execution icons formed to execute functions including copying, cutting, sharing and the like may be displayed adjacent to the block.

FIGS. 11A to 11E are conceptual diagrams illustrating an operation of providing an attribute to a cursor in the mobile terminal according to an exemplary embodiment.

Figure 11A:
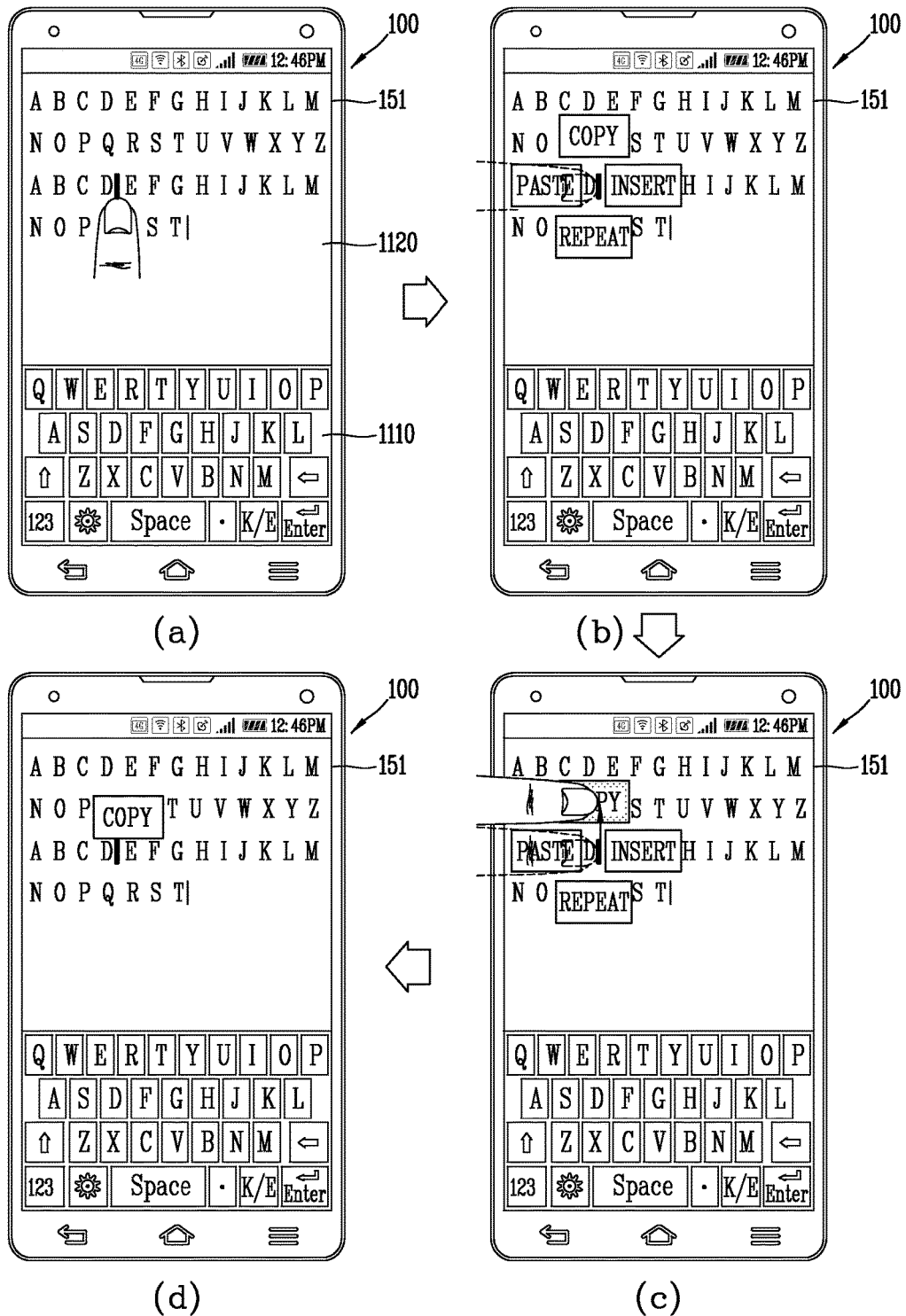
FIGS. 11A to 11E are conceptual diagrams illustrating an operation of providing an attribute to a cursor in the mobile terminal according to an exemplary embodiment.

When a touch is applied at a position where a cursor is displayed as shown in FIG. 11A, a plurality of graphic objects (e.g., 'copy', 'insert', 'repeat' and 'paste') formed to provide attributes to the cursor are formed Subsequently, when the touch is not released but continuously moves from the initially touched point in the state in which the plurality of graphic objects are displayed, any one graphic object positioned in the moving direction of the touch is selected from the plurality of graphic objects. For example, when the touch moves to a position where "copy" is displayed, an attribute corresponding to the "copy" is provided to the cursor.

If an attribute is provided to the cursor, guidance information for guiding the provided attribute may be displayed near the cursor. For example, when the attribute provided to the cursor is the "copy", guidance information for guiding the provided attribute may be displayed near the cursor.

Hereinafter, functions related to attributes of the cursor will be described in detail with reference to FIGS. 11B to 11E.

Figure 11B:
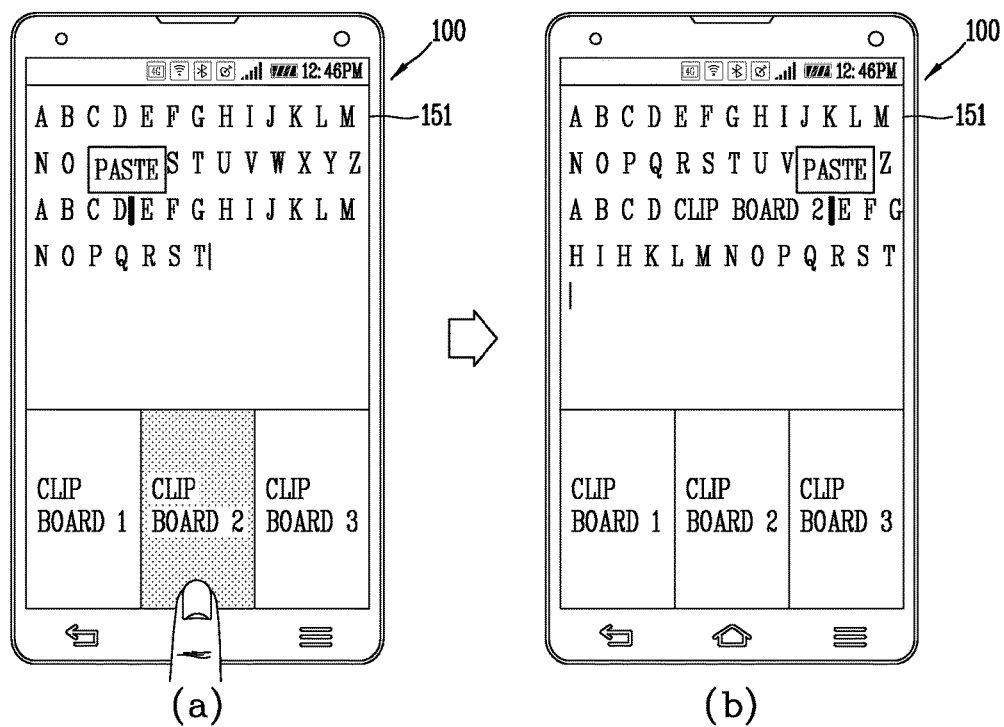

FIG. 11B is a diagram illustrating an attribute "paste". When the attribute "paste" is provided to the cursor, data stored in a clipboard is displayed in a partial area of the display unit 151. The data stored in the clipboard means a text or the like which can be inserted at the position where the cursor is displayed. When at least one of clipboards displayed in a partial area of the display unit 151 is selected, data of the selected clipboard is inserted at the position of the cursor.

Figure 11C:
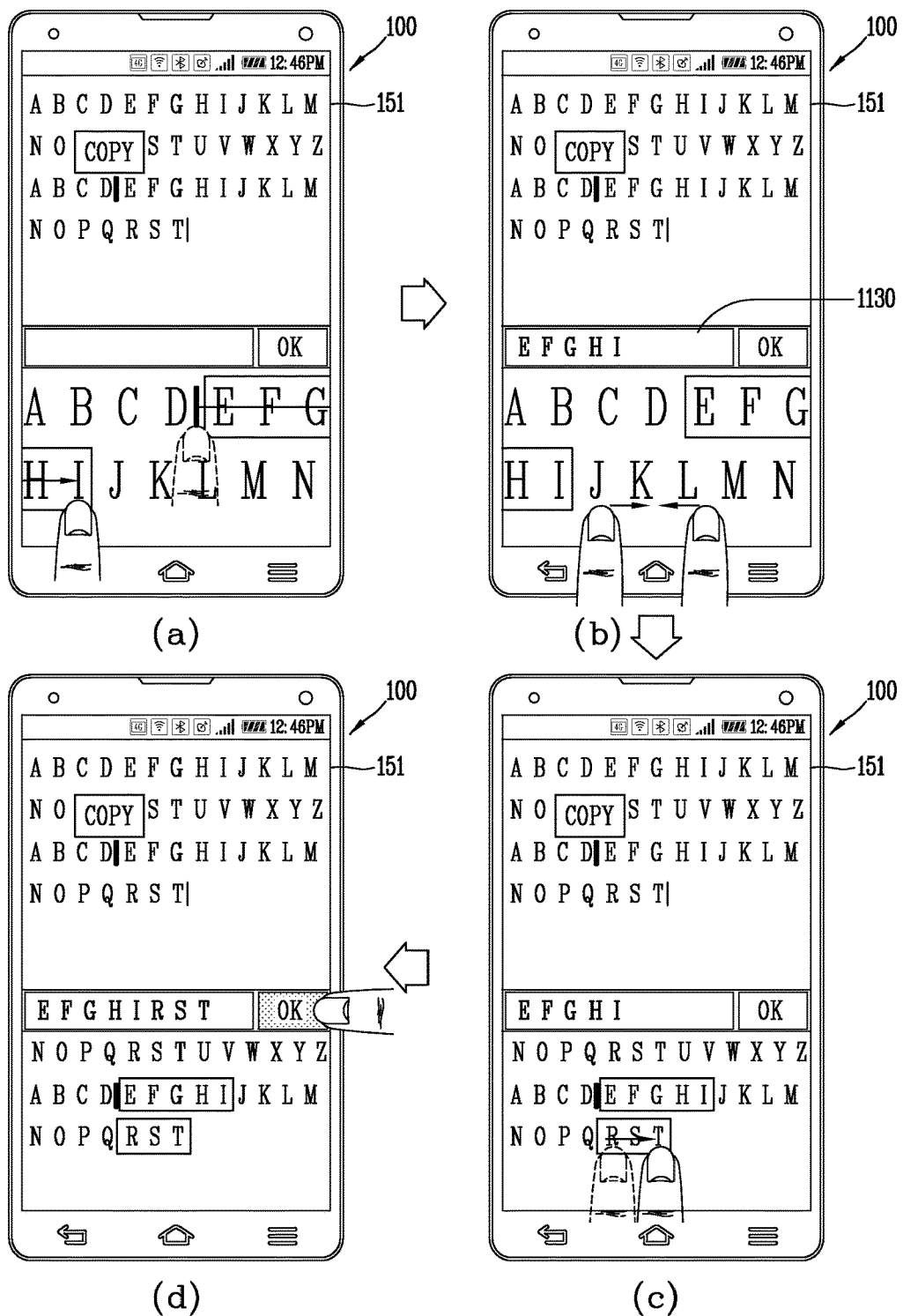

FIG. 11C is a diagram illustrating an attribute "copy". When the attribute "copy" is provided to the cursor, texts positioned near the cursor is magnified to be displayed in a partial area of the display unit 151. The controller may selectively store, in a clipboard, the texts displayed in the partial area, based on a user input. For example, "ABCDEFGHIJKLMN" positioned near the cursor may be displayed in a partial area of the display unit 151. In addition, a swapping input that continuously moves from a first point to a second point may be sensed in the partial area. The controller may select a portion to be stored in the clipboard, in response to the swapping input. The portion selected by the swapping input may be highlighted to be distinguished from the other portions. For example, a portion ("EFGHI")

selected by a swapping input may be displayed to be distinguished from the other portions.

Meanwhile, the amount of the texts displayed in the partial area may be changed by a user input. For example, when a pinch-out gesture is sensed in the partial area, the controller may increase the amount of the texts displayed in the partial area.

The texts selected by the swapping input are displayed on a separate window 1130, and may be stored (or added) in a clipboard by a touch input with respect to the "OK" button. A portion (e.g., "EFGHI") selected by a first swapping input and a portion (e.g., "RST") selected by a second swapping input may be combined together to be stored (or added) in one clipboard.

Figure 11D:
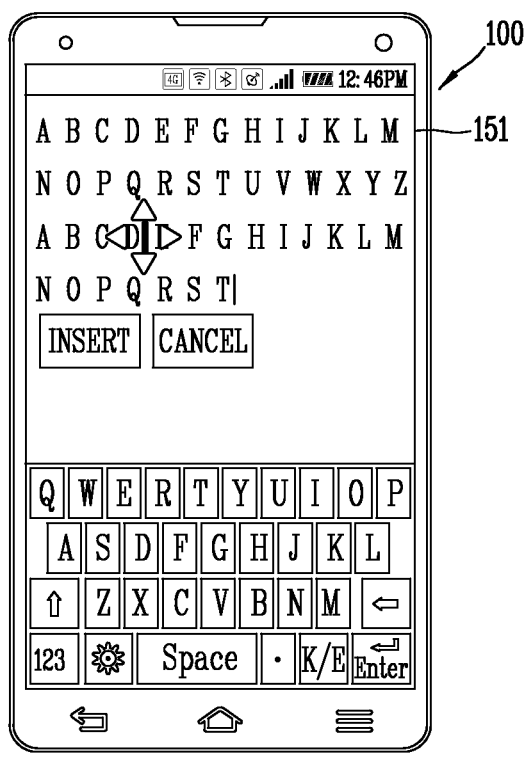

FIG. 11D is a diagram illustrating an attribute "insert". When the attribute "insert" is provided to the cursor, the controller displays, near the cursor, cursor movement buttons formed to more precisely control movement of the cursor. The user applies a touch to at least one of the cursor movement buttons, thereby simply and precisely moving the cursor. For example, when a touch is applied to a cursor movement button in the right direction, the cursor may move one space to the right.

Figure 11E:
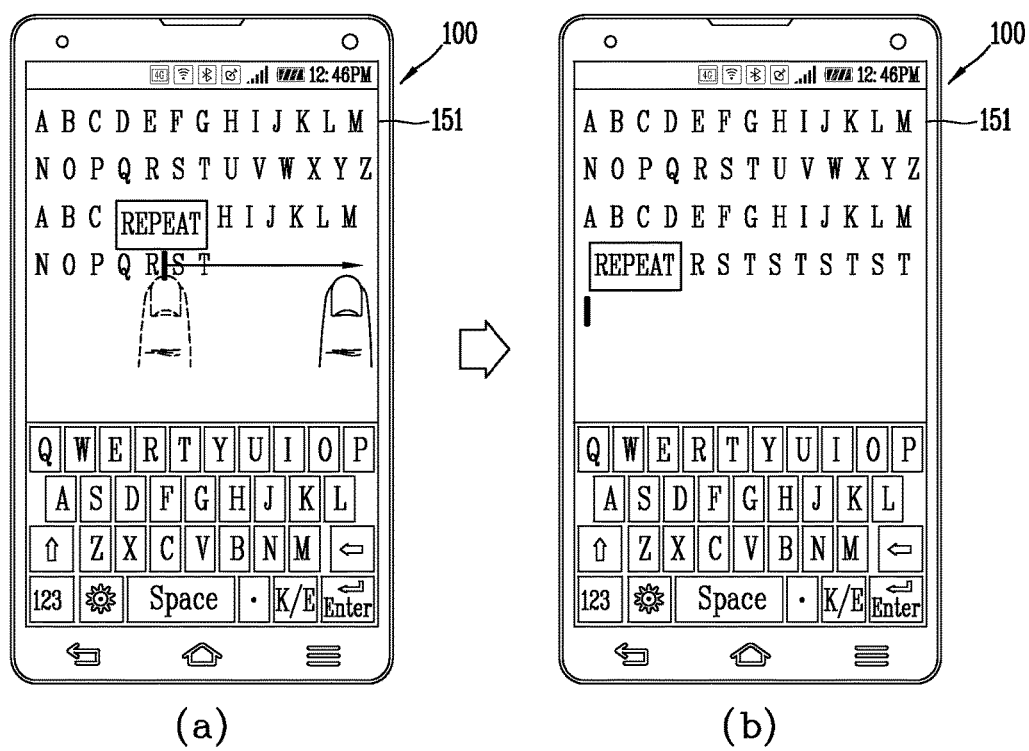

FIG. 11E is a diagram illustrating an attribute "repeat". When a drag input with respect to the cursor is applied in a state in which the attribute "repeat" is provided to the cursor, a specific text is repeatedly pasted up to a point where the drag input is finished. More specifically, when that a touch starting from a first point continuously moves to a second point and then released is defined as a drag input, the controller may track the trace of the drag input. In this state, the controller extracts a text included in the place where the drag input passes. When an empty space in which the text can be input exists at the place where the drag input passes, the controller pastes the extracted text. For example, as shown in FIG. 11E, "ST" included in the place where a drag input passes is extracted. The extracted "ST" is repeatedly pasted in an empty space in which a text can be input in the place where the drag input passes. Accordingly, the user can simply input a text to be repeatedly input.

Figure 12A:
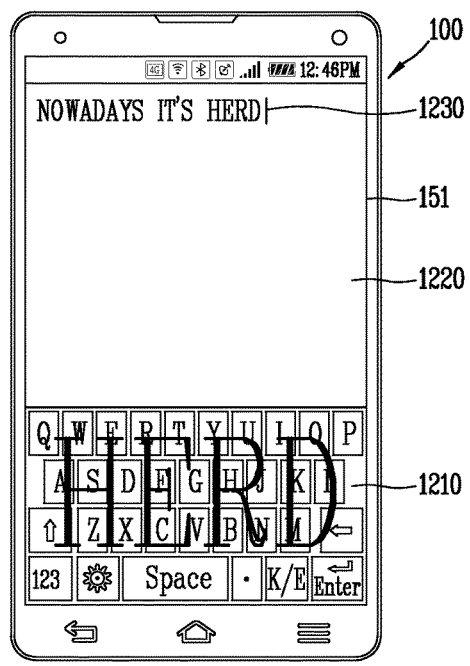
FIGS. 12A and 12B are conceptual diagrams illustrating a method for outputting guidance information for guiding a user to the fact that a typo is input in the mobile terminal according to an exemplary embodiment.
Figure 12B:
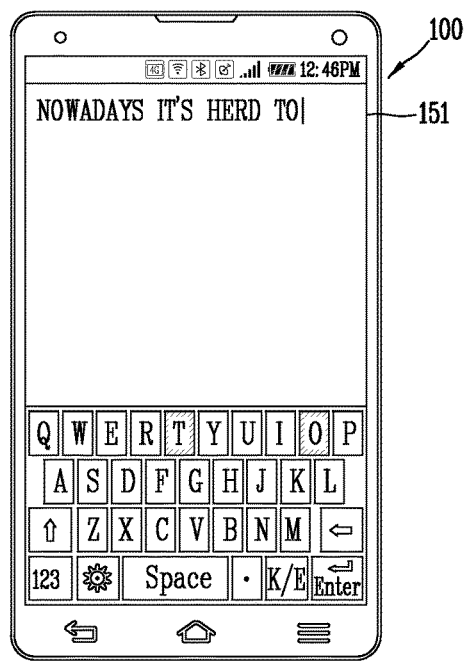

FIGS. 12A and 12B are conceptual diagrams illustrating a method for outputting guidance information for guiding a user to the fact that a typo is input in the mobile terminal according to an exemplary embodiment.

In the mobile terminal according to the exemplary embodiment, the display unit 151 may include an input window 1210 and an output window 1220, and a character may be input in real time on the output window 1220 based on a touch applied to the input window 1210. In addition, a main cursor 1230 for guiding a point at which the character is input may be displayed.

Meanwhile, when characters that do not correspond to the grammar are detected in a text, the controller magnifies the detected characters in translucency to a predetermined size and displays the magnified characters on the input window 1210 for a reference time. As shown in FIG. 12A, characters ('HERD') that do not correspond to the grammar are included in a text ('NOWADAYS IT'S HERD') included in the output window, and therefore, the controller may display a typo on the virtual keypad.

Meanwhile, when a touch is applied to the virtual keypad, the color of a key touched to guide that the touch is applied may be arbitrarily changed. That is, a background shadow is generated in the touched key for a predetermined time. The controller may guide the fact that a typo has occurred. More specifically, when characters that do not correspond to the grammar are detected in a text, the generation time of a background shadow is controlled to be long. For example, as shown in FIG. 12B, when characters ('TO') are input after the typo ('HERD') is detected, the background shadow is continued in soft keys ('T' and 'O') corresponding to the input characters.

Generally, when the user performs typing, the user's visual field faces the virtual keypad, and hence there occurs a case where the user does not identify which characters are input on the output window. However, according to the present disclosure, a typo is displayed on the virtual keypad for a predetermined time, or a background shadow is displayed differently from usual on a touched key. Hence, the user can immediately recognize characters to be corrected, and correct the typo.

As such, if the editing mode is executed, a second cursor different from a first cursor is displayed, and the user may selectively activate any one of the first and second cursors. Since it is unnecessary to directly move a cursor by touching a point to be corrected, the user's convenience is improved. In the present disclosure, it is possible to provide a new user's convenience that provides a light source for a front camera as the brightness of at least one area of the display unit is controlled.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
a display unit configured to have a first area and a second area, the first area to display a keypad and to receive a touch input at the keypad, the second area to display a character that is input based on the touch input at the displayed keypad, and the second area to display a first cursor to identify a position of the second area at which the character is to be displayed; and
a controller configured to display a second cursor at the second area, and to selectively activate one of the first cursor and the second cursor when an editing mode is executed while the first cursor is displayed,
wherein the editing mode is a state in which the first cursor and the second cursor are displayed at a same time, wherein the character that is input based on the displayed keypad is input at a position of the activated one of the first cursor and the second cursor,
in response to inputting of at least one character when the first cursor is the activated one of the first cursor and the second cursor, the first cursor moves to a position at which a new character is to be input, and the second cursor is configured to start moving when a predetermined time elapses after the first cursor moves and to move along a path of the moving first cursor until the position at which the first cursor is displayed,
wherein the displayed second cursor to move at a first speed when a typographic error is at the position where the second cursor is displayed, and the displayed second cursor to move at a second speed when a typographic error is not provided, wherein the first speed is slower than the second speed,
in response to the inputting of at least one character being stopped, the first cursor stops moving and the second cursor continuously moves along the path of the moving first cursor until the position at which the first cursor is displayed, and
wherein when the second cursor is activated, movement of the second cursor and the first cursor is stopped.

2. The mobile terminal of claim 1, wherein in response to the typographical error in an inputted text, the controller to display the second cursor at a position corresponding to the typographical error.

3. The mobile terminal of claim 2, wherein in response to activation of one of the first cursor and the second cursor, the activated one of the first cursor and the second cursor is highlighted to be distinguished from the other one of the first cursor and the second cursor.

4. The mobile terminal of claim 3, wherein while the editing mode is executed, the display unit to display a cursor selection icon to selectively activate one of the first cursor and the second cursor, and one of the first cursor and the second cursor is activated based on a touch at the cursor selection icon.

5. The mobile terminal of claim 4, wherein in response to a touch that moves in a first direction while the first cursor is activated, the controller to activate the second cursor.

6. The mobile terminal of claim 5, wherein while the second cursor is activated, the display unit to change from displaying the keypad to displaying a debugging pad related to the second cursor, and
wherein the displayed debugging keypad includes one or more keys not included in the displayed keypad, and the one or more keys include one or more keys related to a function formed to execute a function for correcting the typographical error.

7. The mobile terminal of claim 1, wherein while the editing mode is executed, the display unit to display a cursor movement icon to move the displayed second cursor, and
wherein in response to a touch at the displayed cursor movement icon, the controller to move the displayed second cursor.

8. The mobile terminal of claim 7, wherein the controller to move the displayed second cursor for each word based on a touch at the displayed cursor movement icon.

9. The mobile terminal of claim 8, wherein the controller to display a plurality of guidance bars to identify positions at which the second cursor is to be moved, and
wherein the second cursor is displayed at a position of one of the plurality of guidance bars.

10. The mobile terminal of claim 1, wherein in response to a search command with respect to a search word inputted in a text, the controller to search for a word similar to the search word,
wherein when one or more similar words are searched, the controller to execute the editing mode, and to display sub-cursors respectively at positions corresponding to the searched one or more words, and
wherein the second cursor is one of the sub-cursors.

11. The mobile terminal of claim 1, wherein when at least one typographical error is provided in an inputted text, the controller to display a typographical error list that includes at least one typographical error item, and
wherein in response to a touch at one typographical error item in the displayed typographical error list, the controller to execute the editing mode, to display the second cursor at a position corresponding to the displayed typographical error item, and to activate the second cursor.

12. A method for controlling a mobile terminal, the method comprising:
displaying, at a display, a keypad and a first cursor, the displayed keypad including a plurality of keys, the first cursor to identify a position at which a character is to be input based on a touch at the keypad;
displaying, at the display, a second cursor, when an editing mode is executed while the first cursor is displayed on the display;
selectively activating one of the first cursor and the second cursor based on an input; and
displaying, in response to a touch at one of the keys of the keypad, a character at the activated one of the first cursor and the second cursor,
wherein the editing mode is a state in which the first cursor and the second cursor are displayed at a same time, wherein the character that is input based on the displayed keypad is input at a position of the activated one of the first cursor and the second cursor,
in response to inputting of at least one character when the first cursor k the activated one of the first cursor and the second cursor, the first cursor moves to a position at which a new character is to be input, and the second cursor is configured to start moving, later than the first cursor, along a path of the moving first cursor up to the position at which the first cursor is displayed and the second cursor sequentially moves along places on the display through which the first cursor passes,
wherein the displayed second cursor to move at a first speed when a typographic error is at the position where the second cursor is displayed, and the displayed second cursor to move at a second speed when a typographic error is not provided, wherein the first speed is slower than the second speed, wherein in response to the inputting of at least one character being stopped, the first cursor stops moving and the second cursor continuously moves along the path of the moving first cursor until the position at which the first cursor is displayed, and wherein when the second cursor is activated, movement of the second cursor is stopped.

13. The method of claim 12, wherein in response to the typographical error in an inputted text, the second cursor is displayed at a position corresponding to the typographical error.

\* \* \* \* \*